US012538302B2

(12) United States Patent
Xu et al.

(10) Patent No.: US 12,538,302 B2
(45) Date of Patent: Jan. 27, 2026

(54) SLOT FORMAT VALIDATION

(71) Applicant: QUALCOMM Incorporated, San Diego, CA (US)

(72) Inventors: Changlong Xu, Beijing (CN); Jing Sun, San Diego, CA (US); Yi Huang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 282 days.

(21) Appl. No.: 18/044,317

(22) PCT Filed: Dec. 4, 2020

(86) PCT No.: PCT/CN2020/133850
§ 371 (c)(1),
(2) Date: Mar. 7, 2023

(87) PCT Pub. No.: WO2022/116136
PCT Pub. Date: Jun. 9, 2022

(65) Prior Publication Data
US 2023/0328725 A1 Oct. 12, 2023

(51) Int. Cl.
*H04W 72/1268* (2023.01)
*H04W 72/11* (2023.01)
(Continued)

(52) U.S. Cl.
CPC ........ *H04W 72/1268* (2013.01); *H04W 72/11* (2023.01); *H04W 72/121* (2013.01); *H04W 72/566* (2023.01)

(58) Field of Classification Search
CPC ............. H04W 72/1268; H04W 72/11; H04W 72/121; H04W 72/566; H04W 72/23; H04L 1/1854
See application file for complete search history.

(56) References Cited

U.S. PATENT DOCUMENTS 11,683,697 B2 * 6/2023 Sun ................... H04W 72/0446
370/329
2018/0270895 A1 9/2018 Park et al.
(Continued)

FOREIGN PATENT DOCUMENTS

CN 110139352 A 8/2019
CN 110831199 A 2/2020
(Continued)

OTHER PUBLICATIONS

International Search Report and Written Opinion—PCT/CN2020/133850—ISA/EPO—Aug. 27, 2021.
(Continued)

*Primary Examiner* — Ivan O Latorre
(74) *Attorney, Agent, or Firm* — Harrity & Harrity LLP

(57) ABSTRACT

Systems, methods, and mechanisms for modifying or cancelling uplink transmissions using dynamic slot format validation are provided. One aspect of the present disclosure includes a method of wireless communication performed by a user equipment (UE). The method of wireless communication includes determining that an uplink (UL) transmission is configured for a first time period; monitoring for a slot format indicator (SFI) validation associated with the first time period; and determining, based at least in part on the monitoring, whether to transmit the UL transmission during the first time period.

22 Claims, 14 Drawing Sheets

(51) Int. Cl.
  *H04W 72/121* (2023.01)
  *H04W 72/566* (2023.01)

(56) References Cited

U.S. PATENT DOCUMENTS

| | | | | |
|---|---|---|---|---|
| 2018/0279304 A1* | 9/2018 | Lee | | H04L 5/0094 |
| 2019/0132092 A1* | 5/2019 | Chen | | H04W 76/27 |
| 2019/0191322 A1* | 6/2019 | Sun | | H04W 72/0446 |
| 2019/0245648 A1* | 8/2019 | Jo | | H04W 72/12 |
| 2019/0313476 A1* | 10/2019 | Sun | | H04L 5/0053 |
| 2020/0045696 A1* | 2/2020 | Huang | | H04L 5/0007 |
| 2020/0053728 A1* | 2/2020 | Huang | | H04L 27/2601 |
| 2020/0154477 A1* | 5/2020 | Sun | | H04W 16/14 |
| 2020/0229231 A1* | 7/2020 | Oh | | H04W 80/08 |
| 2020/0259896 A1* | 8/2020 | Sachs | | H04L 67/12 |
| 2020/0287676 A1* | 9/2020 | Jo | | H04B 7/0626 |
| 2020/0351872 A1* | 11/2020 | Cai | | H04W 72/23 |
| 2021/0105803 A1* | 4/2021 | Yang | | H04L 5/0087 |
| 2021/0120431 A1* | 4/2021 | Sun | | H04W 72/0446 |
| 2021/0176747 A1* | 6/2021 | Yang | | H04L 5/0044 |
| 2021/0258994 A1* | 8/2021 | Bae | | H04W 72/535 |
| 2021/0306991 A1* | 9/2021 | Sun | | H04W 72/51 |
| 2021/0352673 A1* | 11/2021 | Yang | | H04L 5/0064 |
| 2022/0103307 A1* | 3/2022 | Yang | | H04W 72/23 |
| 2022/0369316 A1* | 11/2022 | Zewail | | H04W 72/0446 |
| 2023/0058331 A1* | 2/2023 | Takahashi | | H04W 72/0446 |
| 2023/0111395 A1* | 4/2023 | Li | | H04L 5/1469 370/329 |
| 2023/0232421 A1* | 7/2023 | Yi | | H04B 7/088 370/329 |
| 2023/0269709 A1* | 8/2023 | Dimou | | H04W 72/21 370/280 |
| 2023/0328725 A1* | 10/2023 | Xu | | H04L 1/1854 370/329 |
| 2024/0088945 A1* | 3/2024 | Yuan | | H04W 72/542 |

FOREIGN PATENT DOCUMENTS

| | | |
|---|---|---|
| CN | 110999496 A | 4/2020 |
| WO | WO-2022091556 A1 * | 5/2022 |

OTHER PUBLICATIONS

Samsung: "DL Signals and Channels for NR-U", 3GPP TSG RAN WG1 #101, R1-2003858, Jun. 5, 2020 (Jun. 5, 2020), 5 Pages, the whole document.

* cited by examiner

SLOT FORMAT VALIDATION

CROSS-REFERENCE TO RELATED APPLICATIONS

The present application is a 35 U.S.C. 371 National Phase entry of Patent Cooperation Treaty (PCT) Application No. PCT/CN2020/133850, filed Dec. 4, 2020, which is hereby incorporated by reference in its entirety.

TECHNICAL FIELD

This application relates to wireless communication systems, and more particularly to slot format validation.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may configure a UE with various time domain duplexing (TDD) configurations, which define the transmission direction (uplink/downlink/flexible) of slots and/or symbols within a DL-UL transmission period. Further, a BS may configure a UE with semi-persistent scheduling (SPS), which configures a UE to monitor for downlink data within a set of periodic resources.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One aspect of the present disclosure includes a method of wireless communication performed by a user equipment (UE). The method of wireless communication includes determining that an uplink (UL) transmission is configured for a first time period; monitoring for a slot format indicator (SFI) validation associated with the first time period; and determining, based at least in part on the monitoring, whether to transmit the UL transmission during the first time period.

One aspect of the present disclosure includes a method of wireless communication performed by a base station (BS). The method of wireless communication includes transmitting first downlink information including a first slot format indicator (SFI) and a validation field indicating the first SFI is invalid for a first group of user equipments (UEs) and valid for a second group of UES. The communication also includes receiving, from at least a first UE of the first group of UEs, an UL transmission based on the first SFI being invalid for the first group of UEs.

One aspect of the present disclosure includes a user equipment (UE) including a processor configured to: determine that an uplink (UL) transmission is configured for a first time period; monitor for a slot format indicator (SFI) validation associated with the first time period; and determine, based at least in part on the monitoring, whether to transmit the UL transmission during the first time period.

One aspect of the present disclosure includes a base station (BS) including a transceiver configured to transmit first downlink information including a first slot format indicator (SFI) and a validation field indicating the first SFI is invalid for a first group of user equipments (UEs) and valid for a second group of UEs; and receive, from at least a first UE of the first group of UEs, an UL transmission based on the first SFI being invalid for the first group of UEs.

One aspect of the present disclosure includes a non-transitory computer-readable medium having program code stored thereon. The program code comprises: code for causing a user equipment (UE) to determine that an uplink (UL) transmission is configured for a first time period; code for causing the UE to monitor for a slot format indicator (SFI) validation associated with the first time period; and code for causing the UE to determine, based at least in part on the monitoring, whether to transmit the UL transmission during the first time period.

One aspect of the present disclosure includes a non-transitory computer-readable medium having program code stored thereon. The program code comprises: code for causing a base station (BS) to transmit first downlink information including a first slot format indicator (SFI) and a validation field indicating the first SFI is invalid for a first group of user equipments (UEs) and valid for a second group of UEs. The transitory also includes code for causing the BS to receive, from at least a first UE of the first group of UEs, an UL transmission based on the first SFI being invalid for the first group of UEs.

One aspect of the present disclosure includes a user equipment (UE). The user equipment includes: means for determining that an uplink (UL) transmission is configured for a first time period; means for monitoring for a slot format indicator (SFI) validation associated with the first time period; and means for determining, based at least in part on the monitoring, whether to transmit the UL transmission during the first time period.

One aspect of the present disclosure includes a base station (BS). The base station includes: means for transmitting first downlink information including a first slot format indicator (SFI) and a validation field indicating the first SFI is invalid for a first group of user equipments (UEs) and valid for a second group of UEs. The station also includes means for receiving, from at least a first UE of the first group of UEs, an UL transmission based on the first SFI being invalid for the first group of UEs.

Other aspects and features of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
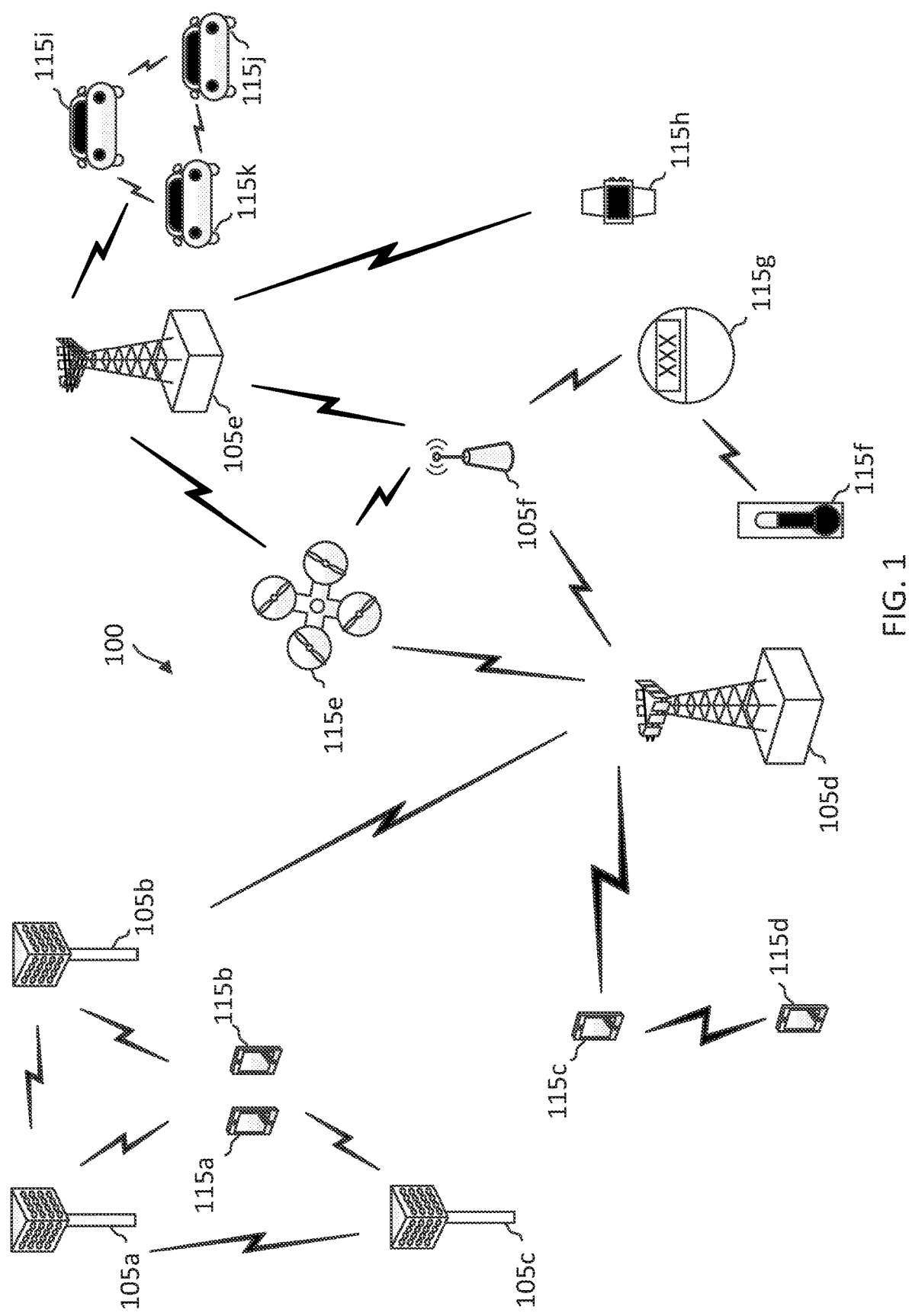
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In 5G NR, a BS can configure a UE with various time division duplexing (TDD) configurations, which define the transmission direction or type (e.g., downlink (DL), uplink (UL), flexible) for entire slots and/or individual symbols within a slot. For instance, a DL symbol may be used for DL transmission, an UL symbol may be used for UL transmission, and a flexible symbol may be used for UL or DL transmission. A BS may configure the UE with a TDD configuration using radio resource control (RRC) parameters. The TDD configuration may be associated with a TDD periodicity, where a pattern of DL-UL slots and symbols is repeated over one or more TDD periods. The BS may dynamically configure a flexible symbol to be an UL symbol or a DL symbol at a later time, for example, via slot format indicator (SFI) signaling.

Further, a BS may configure a UE to monitor for downlink data using a semi-persistent scheduling (SPS) scheme. For example, in some applications, such as Internet of Things (IoT) applications or industrial Internet of Things (IIoT) applications, a network may control a large number of UEs and devices (e.g., smart meters, smart sensors, machines, motors, etc.). In some scenarios, the network may control the operations of the devices and may frequently transmit control commands to the devices. In such scenarios, the DL traffic (e.g., physical downlink shared channel (PDSCH) transmissions) may be frequent, but the packet size may be relatively small (e.g., a few bytes to tens of bytes per packet). As such, dynamic scheduling that utilizes PDCCH DCI signaling for each and every transmission can cause a large control channel (PDCCH) overhead. Thus, dynamic scheduling may not be suitable for these applications, and SPS may be more suitable.

SPS is also available for DL/UL communications, primarily to support traffic, such as voice applications, with a periodic pattern. For instance, a BS may preconfigure a UE with a configured schedule radio network temporary identifier (CS-RNTI) and a periodicity for a SPS-based schedule (e.g., a SPS configuration). Once pre-configured, the UE may monitor for an UL or DL allocation using the CS-RNTI. The BS may activate the SPS configuration by transmitting a physical downlink control channel (PDCCH) downlink control information (DCI) message with a cyclic redundancy check (CRC) scrambled with the CS-RNTI. The PDCCH DCI message may indicate a resource allocation (e.g., time-frequency resource) and transmission parameters (e.g., modulation coding scheme (MCS)). Once activated, the resource allocation is repeated according to the preconfigured periodicity. Accordingly, the UE may receive the activation including the resource allocation and transmission parameters based on the CS-RNTI. The UE may continue to utilize the resource allocation according to the periodicity. For instance, if the SPS configuration is for UL communications, the UE may transmit UL data packet in any of the SPS resources. Alternatively, if the SPS configuration is of DL communications, the UE may monitor for a DL packet in each of the SPS resources.

Not every SPS occasion being monitored by a UE may actually be used. The UE may be configured to monitor a number of SPS occasions (e.g., PDSCH occasions or time-frequency resources), but the BS may refrain from transmitting DL data during some of the SPS occasions, for example, based on a traffic pattern and/or the volume of data to be transmitted. The UE may not always be aware of whether a specific SPS occasion was intended to contain DL data. For example, a BS may transmit DL data to be received by the UE during a SPS occasion, but due to obstructions blocking the beam used to transmit the DL data, the UE may not receive the transmission and incorrectly interpret the non-reception of the DL data as an empty SPS occasion.

Additionally, hybrid automatic repeat request (HARQ) may be applied to the PDSCH transmissions, for example, to improve reliability. When HARQ is applied to a SPS PDSCH transmission, the UE may provide HARQ acknowledgement/negative-acknowledgement (ACK/NACK) feedback for each SPS resource. For instance, the UE may perform decoding in each SPS resource and transmit HARQ ACK/NACK feedback for each SPS resource, for example, via a physical uplink control channel (PUCCH). Since the UE may not be aware when the BS may skip or cancel a transmission in a SPS resource, the UE may unnecessarily perform packet decoding and transmit HARQ NACKs for SPS resources where no SPS transmission is performed by the BS (e.g., the UE may interpret an intentionally empty SPS occasion as a non-empty occasion and assume the presence of an error). The unnecessary packet decoding can impact power and resource utilization at the UE, and the redundant HARQ feedback transmissions can impact radio resource or bandwidth utilization.

The present disclosure provides mechanisms for modifying or cancelling uplink transmissions using dynamic slot format validation. For example, a BS may transmit a slot format indicator (SFI) to cause the UE to override one or more flexible symbols of a UE's TDD configuration as DL. A BS may configure a UE with a plurality of slot format combinations, which define a DL/UL/Flexible pattern of symbols for each of a plurality of slots. The BS may transmit one or more SFIs to the UE in downlink information (e.g., downlink control information (DCI)), and the UE applies the SFI for a number of slots as defined by the SFI. According to one example, a UE using SPS may schedule an uplink transmission (e.g., ACK/NACK) in one or more symbols defined as "flexible" by the UE's TDD configuration. If the BS determines that no downlink transmission is scheduled for a SPS monitoring occasion, the BS can transmit a SFI to the UE to override at least one of the flexible symbols scheduled for the uplink transmission as DL. Overriding the flexible symbol(s) as DL causes the UE to cancel or drop the uplink transmission.

UEs may monitor for SFI in a group-common physical downlink control channel (GC-PDCCH) masked by a SFI-radio network temporary identifier (SFI-RNTI) carrying the SFI. Typically, a plurality or group of UEs will be configured to monitor for the SFI in the GC-PDCCH. Accordingly, all the UEs associated with the SFI-RNTI may apply the SFI to dynamically modify their TDD configurations. Thus, using SFI to cancel or reduce UE decoding of downlink data and uplink transmissions may cause undesirable side effects involved with overriding TDD configurations for all UEs within a group.

According to another aspect of the present disclosure, a BS may selectively configure groups, subgroups, and/or individual UEs with SFI to override UL transmissions in SPS. In one aspect, a BS may transmit, with a SFI, a validation field indicating that the SFI is valid for one group of the UEs monitoring for the SFI, but not for one or more other groups of the UEs monitoring for the SFI. In one example, the BS may transmit a DCI including the SFI, a validation field including one or more validation bits, and a cyclical redundancy check (CRC) masked with the SFI-RNTI. In one example, the validation field includes a plurality of validation bits, where each bit is associated with a different group of UEs. Each bit may indicate whether the SFI is valid for its respective group. Accordingly, a validation field having two bits may indicate that the SFI is valid for a first group using a first bit, and indicate that the SFI is invalid for a second group using the second bit. According to another example, the BS may transmit multiple SFIs to a plurality of UEs, where each SFI is associated with its own validation field. For example, the validation field for each SFI may include a single bit to indicate whether the SFI is valid for the particular group.

According to another aspect of the present disclosure, mechanisms are provided to handle SFI validation conflicts in the event more than one SFI is determined valid for a UE, or when no SFI validation has occurred. In some aspects, the BS may ensure that no more than one SFI validation for a given time period occurs for a UE. In other aspects, the BS may configure one or more UEs with a conflict resolution rule indicating which of two or more valid SFIs to apply, whether to apply a default SFI, or some other TDD configuration. In some aspects, if the UE determines that no SFI validation has occurred, the UE may apply a default slot configuration, such as a TDD configuration or a default SFI. In other aspects, if the UE determines that no SFI validation has occurred, the UE may refrain from transmitting UL transmissions during a period of time.

Aspects of the present disclosure can provide several benefits. For example, configuring the UE to drop or cancel unnecessary UL transmissions (e.g., in a PUCCH) when the BS determines that a SPS occasion is empty conserves power and time/frequency resources. Further, configuring the UEs to validate SFI based on validation fields limits the UL transmission dropping to a subset of the UEs monitoring for the SFI, allowing other UEs to perform UL transmissions at the appropriate times. Since these aspects all reduce resource utilization, power savings may also be realized at the UE over existing methods when a BS employs SFI in SPS communication scenarios.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate an UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. AN UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, an UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the networks 100 may operate over a licensed band. A BS 105 may configure a UE 115 with configured grant resources for autonomous UL data transmission. The configured grant resources may be repeated at a certain time interval. The UE 115 may use the configured grant resources for UL HARQ data transmission without being scheduled dynamically by the BS 105. Each configured grant resource may include a set of consecutive transmission slots or time periods. The BS 105 may configure the UE with a set of redundancy version number (RVNs). The UE 115 may determine an order for mapping the configured RVNs to the set of slots or transmission periods. The UE 115 may transmit one or more redundancy versions of a TB in consecutive slots or time periods within a configured grant resource. The UE 115 may also prioritize HARQ processes and/or TBs for transmissions in the configured grant resources.

In some aspects, a BS 105 may preconfigure a UE 115 with an CS-RNTI and a periodicity for a SPS-based schedule (e.g., a SPS configuration). Once pre-configured, the UE 115 may monitor for an UL or DL allocation using the CS-RNTI. The BS 105 may activate the SPS configuration by transmitting a PDCCH DCI message with a CRC scrambled with the CS-RNTI. The PDCCH DCI message may indicate a resource allocation and transmission parameters, such as an MCS. Once activated, the resource allocation is repeated according to the preconfigured periodicity. Accordingly, the UE 115 may receive the activation including the resource allocation and transmission parameters based on the CS-RNTI. The UE 115 may continue to utilize the resource allocation according to the periodicity. For instance, if the SPS configuration is for UL communications, the UE may transmit an UL data packet in any of the SPS resources. Alternatively, if the SPS configuration is of DL communications, the UE may monitor for a DL packet in each of the SPS resources.

In some aspects, the network 100 may support time-sensitive communication (TSC) traffic, such as traffic from IoT and/or IIoT applications, where the network 100 may communicate with IoT devices or IIoT devices (the UEs 115) frequently. For instance, the network 100 may transmit commands to control the operations of the UEs 115. The DL communications may be frequent and the packet size may be small (e.g., a few bytes to tens of bytes). Due to the frequency of the TSC traffic and the small packet size, it may not be suitable for dynamic scheduling. As such, the BS 105 may utilize SPS-based schedules for DL communications with the UEs 115.

According to aspects of the present disclosure, the BS 105 may cause a UE 115 to drop or cancel an UL transmission, such as ACK/NACK, when the BS 105 determines that a SPS occasion is empty. For instance, the BS 105 may transmit first downlink information including a first SFI and a validation field indicating the first SFI is invalid for a first group of UEs and valid for a second group of UEs. A UE 115 of the second group may validate and apply the first SFI, which may override at least one flexible symbol as DL, causing the UE 115 to cancel an UL transmission scheduled for the at least one flexible symbol.

Figure 2:
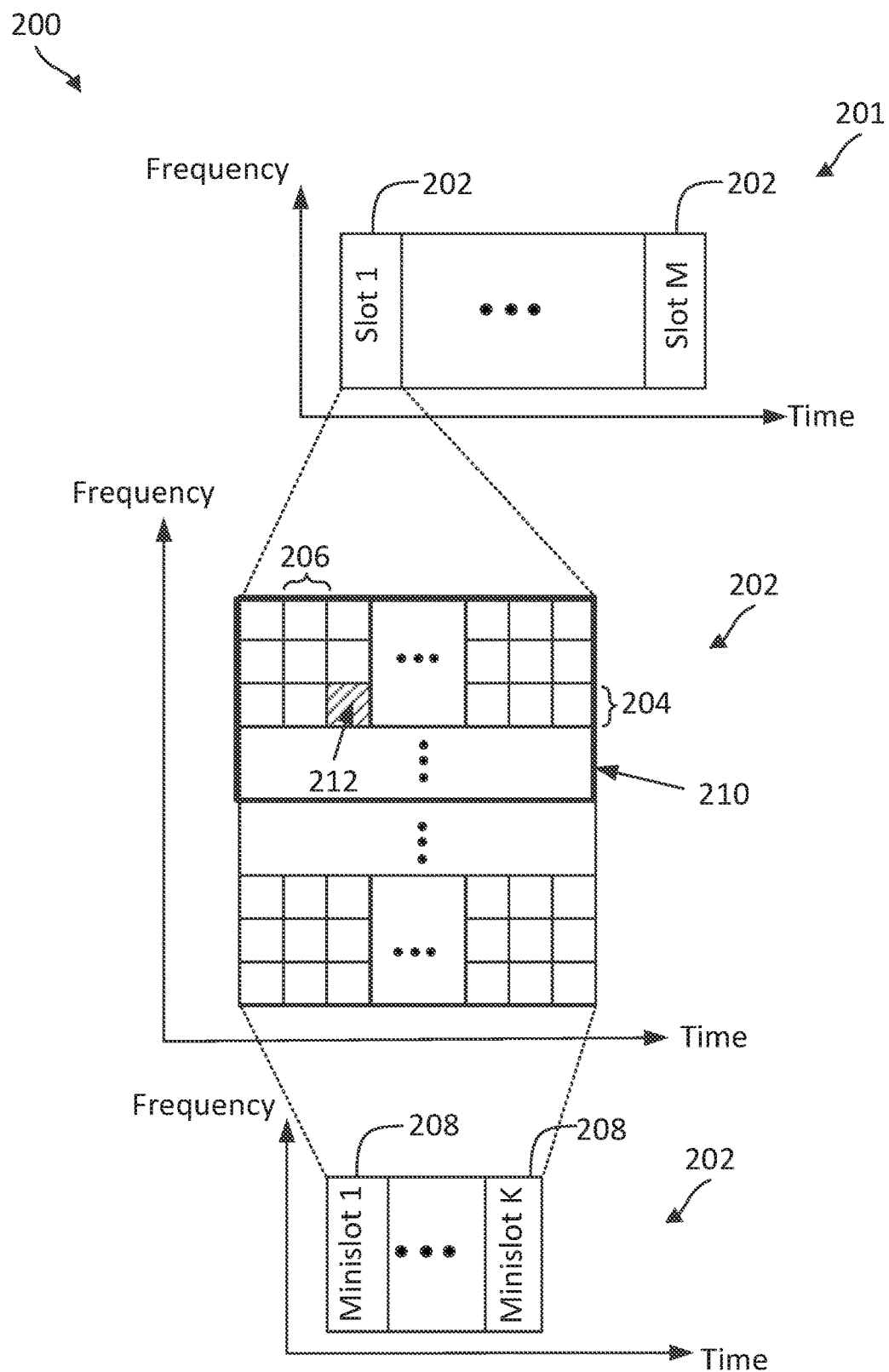
FIG. 2 is a timing diagram illustrating a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The radio frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204 in 1 symbol, 2 symbols, . . . , 14 symbols).

Figure 3:
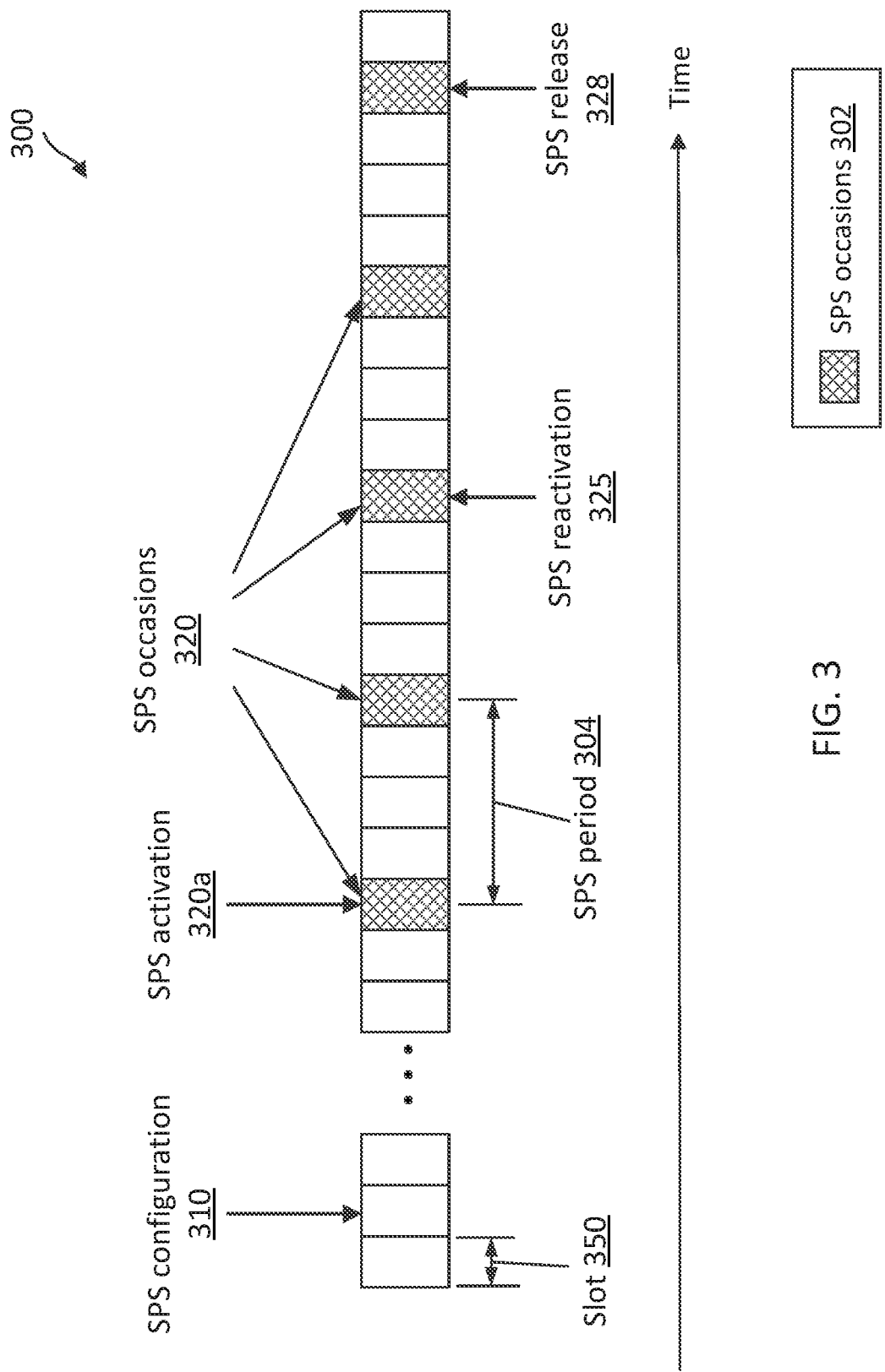
FIG. 3 illustrates a semi-persistent scheduling (SPS)-based communication scenario according to some aspects of the present disclosure.

FIG. 3 illustrates a SPS-based communication scenario 300 according to some aspects of the present disclosure. The x-axis represents time in some arbitrary unit. The scenario 300 can include a frame structure 206 that may be employed by a BS (such as BS 105) for the transmission of data to a UE (such as UE 115) in a network (such as the network 100) using SPS resources. The frame structure 206 may include multiple slots 350.

In the scenario 300, a BS 105 may configure a UE 115 with a SPS configuration 310, for example, via RRC signaling. The SPS configuration 310 may indicate a periodicity (e.g., shown by the SPS period 304) for a SPS-based schedule and a CS-RNTI. In some instances, when HARQ is applied, the SPS configuration 310 may also indicate a HARQ ID identifying a HARQ process associated with the SPS configuration. To activate the SPS configuration 310, the BS 105 may transmit a SPS activation 320, for example, via a DCI message. The BS 105 may include in the DCI message a CRC scrambled with the CS-RNTI. The SPS activation 320 may indicate a number of SPS occasions (e.g., PDSCH occasions), which are time-frequency resources (e.g., certain RB(s) in certain symbol(s) within a certain slot 350). The SPS activation 320 may also indicate transmission parameters (e.g., MCS, antenna port information, resource block allocation information, etc.) to be used for the SPS transmissions. Once activated, the SPS occasions 302 are repeated according to the periodicity configured by the SPS configuration 310. As it may not be necessary for the BS 105 to transmit a PDSCH scheduling grant per transmission, SPS-based scheduling can reduce scheduling overhead.

In the illustrated example of FIG. 3, the SPS occasions 302 associated with the configuration 310 are shown by the patterned filled boxes. The SPS occasions 302 are periodic, repeating at every SPS period 304 (e.g., about four slots 350). In some instances, the SPS occasions 302 may also be referred to as SPS resources, time-frequency resources, or SPS instances. Although FIG. 3 illustrates the SPS configuration 310 configures a SPS schedule periodicity of four slots 350, it should be understood that in other examples a SPS schedule can have a shorter period or a longer period. The SPS configuration 310 may be configured for DL communications. Accordingly, the BS 105 can transmit a data transmission 320 (e.g., PDSCH transmission) to the UE 115 at each SPS occasion 302, and the UE 115 can monitor for a data transmission from the BS 105 in each of the SPS occasions 302. The monitoring may include performing blind packet decoding for data received at each SPS occasion 302.

The BS 105 may transmit a SPS reactivation 325 to reconfigure parameters (e.g., MCS, antenna port information, resource block allocation information, etc.) included in the SPS activation 320. The SPS reactivation 325 may include new values for the parameters, applicable to SPS occasions 302 that follow the SPS reactivation 325. The BS 105 may terminate the SPS schedule by transmitting a SPS release 328 to the UE 115. Upon receiving the SPS release 328, the UE 115 will cease monitoring the SPS occasions 302 indicated by the SPS configuration 310.

As discussed above, in some applications, such as IIoT applications, many devices (e.g., UEs 115) may be controlled by a network (e.g., network 100) with frequent, small-sized packets. To save on control channel signaling overhead (PDCCH DCI signaling overhead), a BS 105 may utilize SPS-based scheduling as shown in the scenario 300 to support these applications. However, not every SPS occasion 302 monitored by the UE 115 may actually be used. The BS 105 may refrain from transmitting DL data during some of the monitored SPS occasions 302, for example, based on traffic and/or the volume of data to be transmitted. The UE 115 may not always be aware of whether a specific SPS occasion was intended to contain DL data, as illustrated by FIG. 3.

Figure 4:
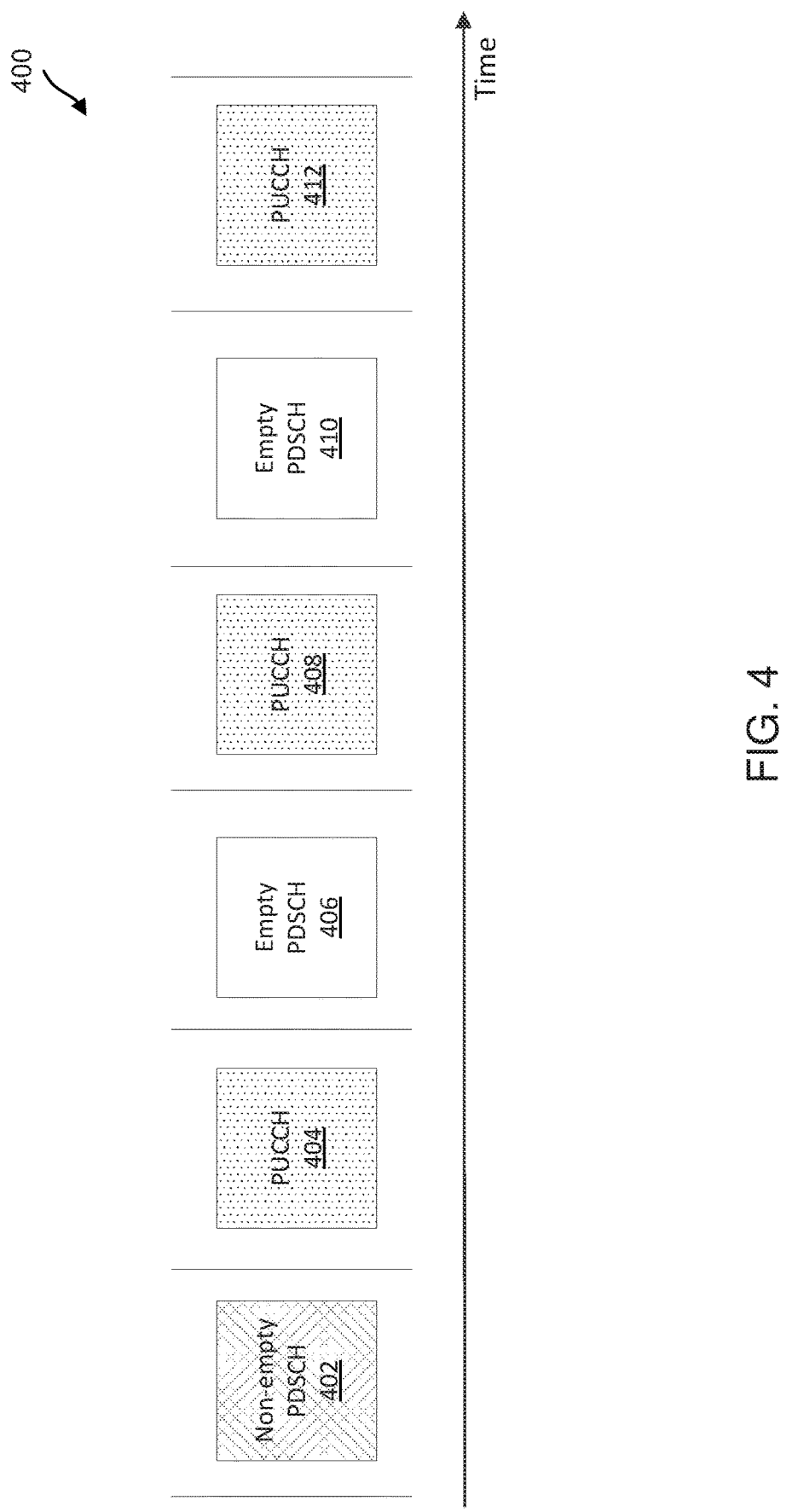
FIG. 4 illustrates a SPS communication scenario according to some aspects of the present disclosure.

FIG. 4 illustrates a SPS-based communication scenario 400 according to some aspects of the present disclosure. The horizontal axis represents time in some arbitrary units. The scenario 400 is illustrated from the point of view of a UE, such as a UE 115 in the network 100. SPS PDSCH occasions (also referred to as SPS occasions or simply occasions throughout this disclosure) 402, 406, and 410 (which may be SPS occasions 320) may be used for transmitting DL data and are followed by PUCCH occasions 404, 408, 412, respectively, which may be used for transmitted HARQ feedback. In some aspects, the BS 105 may configure the UE 115 with PUCCH occasions 404, 408, 412 via configured UL grant and/or a dynamic scheduling grant. For example, PUCCH occasion 404 may be used to transmit HARQ feedback related to SPS PDSCH occasion 402, PUCCH occasion 408 may be used to transmit HARQ feedback related to SPS PDSCH occasion 406, and PUCCH occasion 412 may be used to transmit HARQ feedback related to SPS PDSCH occasion 410. In scenario 400, BS 105 transmits and UE 115 receives DL data in SPS PDSCH occasion 402, as expected. In other words, SPS PDSCH occasion 402 is non-empty. UE 115 may then decode the DL data and provide HARQ feedback to the BS 105 using PUCCH occasion 404. For example, UE 115 may transmit an ACK to the BS 105 in occasion 404 if it was able to successfully decode the DL data, or a NACK otherwise. In some aspects, discontinuous transmission (DTX) may be used, and the BS 105 may indicate to the UE 115 that one or more SPS occasions will not be used to transmit data, allowing the UE 115 to skip monitoring the cancelled (also referred to as empty) occasions. Following a cancelled occasion, the UE 115 may send a dummy NACK or skip transmission of a NACK (depending on the configuration transmitted by the BS 105).

One issue with SPS-based DL communications is that UE 115 is unable to distinguish between an empty SPS PDSCH occasion (e.g., 406, 410) and a SPS transmission with errors. For instance, the BS 105 may refrain from transmitting data in a SPS PDSCH occasion, for example, depending on traffic conditions or the amount of data to be transmitted. In scheduling scenario 400, BS 105 has cancelled transmission of DL data on SPS PDSCH occasion 406. In other words, SPS PDSCH occasion 406 is empty. However, UE 115 is unaware that the SPS PDSCH occasion 406 is empty. As a result, UE 115 attempts to decode what it believes to be DL data in the PDSCH occasion 406, which will result in a decoding failure, and send unnecessary HARQ feedback (e.g., NACK) in the subsequent PUCCH occasion 408. Further, in some instances, BS 105 may transmit data in a SPS PDSCH occasion, which may not be properly received and decoded by the UE. For example, BS 105 may transmit DL data in SPS PDSCH occasion 410, but due to obstructions between the BS 105 and the UE 115, environmental conditions, or other source of error, UE 115 may fail data decoding. To UE 115, SPS PDSCH occasion 410 incorrectly appears empty, which may cause UE 115 to improperly transmit a NACK in PUCCH occasion 412.

One or more of the PUCCH occasions may fall in one or more flexible symbols, as defined by the UE's TDD configuration. Flexible symbols of a UE's TDD configuration can be dynamically changed to DL or UL using SFI. A UE may be configured to monitor for SFI in a group common physical downlink control channel (GC-PDCCH). The SFI may be carried in a DCI masked, or partially masked, with a radio network temporary identifier (RNTI), such as a SFI-RNTI. All UEs configured to monitor for DCI on the GC-PDCCH may receive the SFI to dynamically modify the TDD configuration, or slot configuration. As explained below, the present disclosure describes mechanisms for dropping or cancelling one or more UL transmissions using dynamic slot configurations with validation, such as SFI with validation field.

Figure 5:
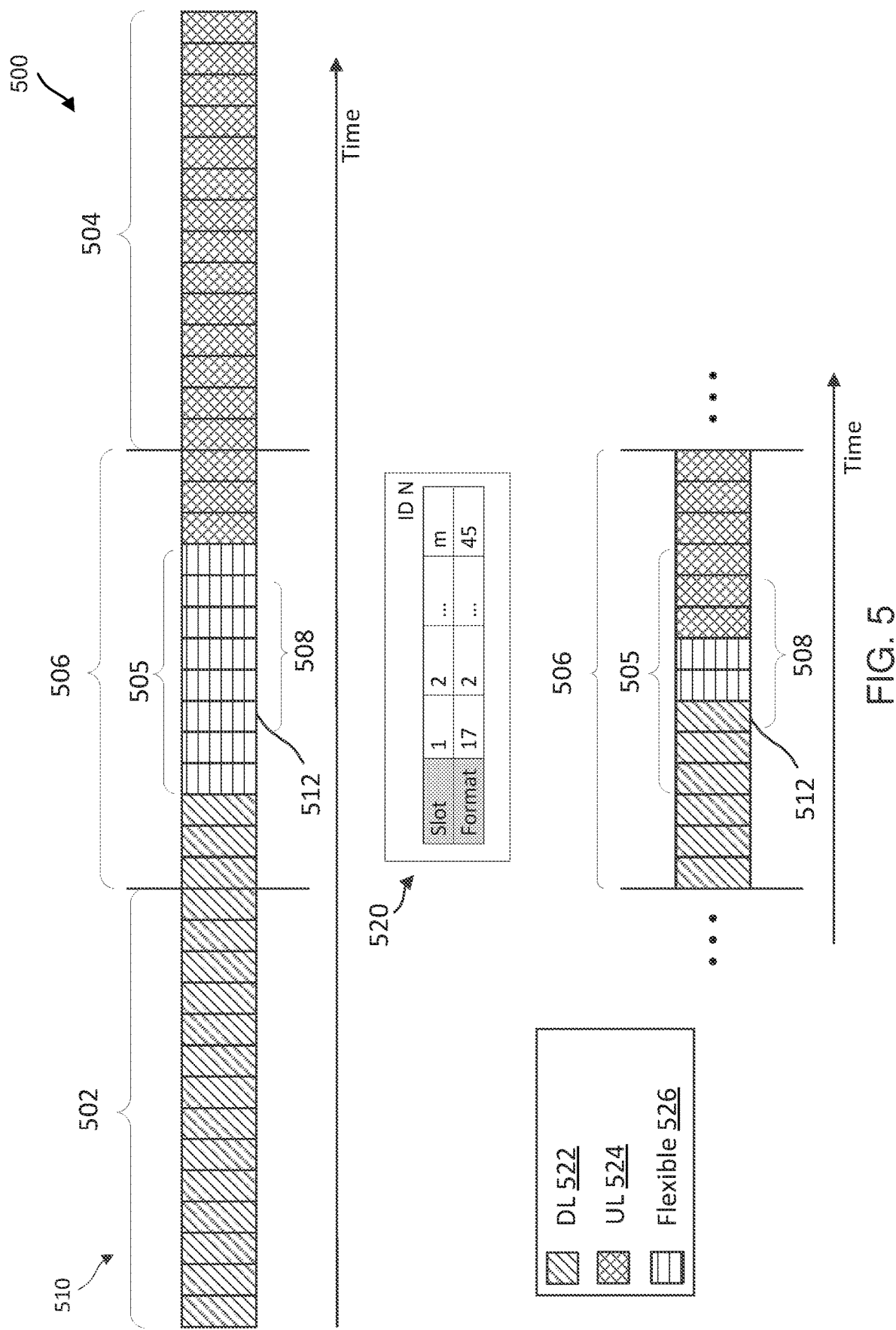
FIG. 5 illustrates a slot format indicator (SFI) communication scheme for cancelling UL transmissions according to some aspects of the present disclosure.

FIG. 5 illustrates a slot format indicator (SFI) communication scheme 500 for cancelling UL transmissions according to some aspects of the present disclosure. The x-axis represents time in some arbitrary unit. The scheme 500 may be performed by a BS, such as one of the BSs 105 in the network 100, and a UE, such as one of the UEs of in the network 100. In some aspects, the scheme 500 may be used in an SPS communication scenario where the BS has configured the UE to monitor for DL data in periodic time/frequency resources which may be referred to as SPS occasions or PDSCH occasions. Using the scheme 500, the BS may cause the UE to drop or cancel at least one UL transmission (e.g., in a PUCCH occasion) by using SFI to override the one or more flexible symbols as DL.

The slot configuration 510 defines each slot, or the symbols within a slot, as DL 522, UL 524, or flexible 526. In some aspects, the slot configuration 510 may be referred to as a TDD configuration and may define a TDD-UL-DL pattern for a certain time duration (e.g., about 0.5 ms to about 10 ms), and may be repeated in time. In one aspect, the slot configuration 510 defines the entire first slot 502 as including DL symbols 522. The slot configuration 510 defines the entirety of a third slot 504 as including UL symbols 524. The slot configuration 510 defines the second slot 506, which may also be referred to as a mixed slot or switching slot, as including some DL symbols 522, some UL symbols 524, and some flexible symbols 526. In particular, the second slot 506 includes a group of flexible symbols 505, which can be overridden using SFI.

As explained above, the UE may be configured with SPS to monitor for DL data in periodic SPS occasions, and to perform UL transmissions such as HARQ feedback in response to attempting to decode each SPS occasion. In the illustrated example, the UE is configured to schedule and perform a UL transmission, such as a HARQ feedback (ACK/NACK), in a group of symbols 508, which includes a portion of the group of flexible symbols 505. As explained above, the BS may determine that no DL transmissions are to be made in at least one SPS occasion associated with the HARQ feedback to be transmitted within the group of symbols 508. As will be further explained below, the BS can use the SFI 520 to define or override flexible symbols 526 as DL/UL, but not the DL symbols 522 and UL symbols 524 statically configured by the BS, which may be configured using radio resource control (RRC) messaging. Overriding at least one flexible symbol allocated for UL transmissions can reduce or eliminate unnecessary HARQ feedback transmitted by the UE.

The BS transmits the SFI 520 to the UE. The SFI includes an identifier number or index N referencing a combination of slot formats for each of a plurality of slots. In FIG. 5, the SFI 520 defines slot format combinations for in slots. The BS may have preconfigured the UE with a plurality of tables specifying the slot number/slot format configuration associated with each SFI index or number transmitted by the BS. Further, the BS may have preconfigured the UE with tables specifying the symbol pattern associated with each slot format number. For example, the UE may store a table specifying that slot format number 1 indicates a slot having all UL symbols, and that slot format number 45 specifies a slot having the pattern DDDDDDFFUUUUUU, where D is DL, F is flexible, and U is UL. The SFI 520 is associated with a SFI period, which may be specified in a number of slots (e.g., m). A BS may transmit the SFI in DL information, which is transmitted in a downlink control channel. In one aspect, the SFI may be transmitted in a group downlink control channel, such as GC-PDCCH, and a plurality of UEs are configured to monitor for the SFI in the GC-PDCCH. In some aspects, each UE may be configured with an RNTI to decode DCI carrying the SFI. In one aspect, the SFI is carried in a DCI 2.0 format, or a DCI format similar to 2.0, where at least part of the DCI is masked or scrambled with a SFI-RNTI. The group of UEs monitoring for the SFI may be configured with the SFI-RNTI such that they can successfully decode the DCI to apply the SFI 520. In other aspects, the SFI may be carried in a DCI of another format, such as a DCI 2.X format masked with an RNTI different from the SFI-RNTI. For example, where DCI 2.0 may have a maximum payload size of 128 bits, another DCI format may have a maximum payload size of more than 128 bits, and may carry a CRC masked or scrambled with a RNTI other than SFI-RNTI.

The UE applies the decoded SFI 520 to the semi-static slot configuration 510 (e.g., TDD configuration) such that at least a portion of the flexible symbols 505 in the switching slot 506 are overridden as either DL symbols 522 or UL symbols 524. In particular, FIG. 5, shows that a first symbol 512, which was defined as a flexible symbol 526 in the statically configured slot configuration 510, has been overridden as a DL symbol 522. The first symbol 512 is within the group of symbols 508 allocated for the UL transmission (e.g., HARQ feedback). When the UE determines that at least one of the symbols of the UL transmission-allocated group of symbols 508 has been overridden as DL, the UE cancels any UL transmissions occurring within that group of symbols 508.

As mentioned above, more than one group of UEs 115 may be configured to monitor for SFI. For instance, all UEs configured to monitor GC-PDCCH and configured with the SFI-RNTI associated with the SFI may receive, decode, and apply the SFI 520. Thus, the effect of cancelling the UL transmission in the allocated group of symbols 508 is not limited to the UE for which no SPS DL transmission has occurred. Rather, one or more UEs that have scheduled UL transmissions, such as HARQ feedback in response to receiving downlink data, may undesirably cancel the UL transmission as well. In some aspects, it may be desirable to dynamically modify DL-UL configurations such that individual UEs or subgroups of UEs can be controlled separately. As explained further below, the present disclosure describes group SFI validation schemes to cancel UL transmissions, where one UE or group of UEs monitoring for SFI can determine the SFI is valid and another UE or group of UEs configured to monitor for the SFI can determine the SFI is invalid such that the SFI is not applied. In one aspect, a BS may transmit the SFI in DCI which also includes a validation field indicating whether the SFI is valid for one or more groups of UEs. Accordingly, unnecessary UL transmissions can still be dropped for one UE or group of UEs, while other UEs or groups of UEs can proceed with UL transmissions as previously configured.

Figure 6:
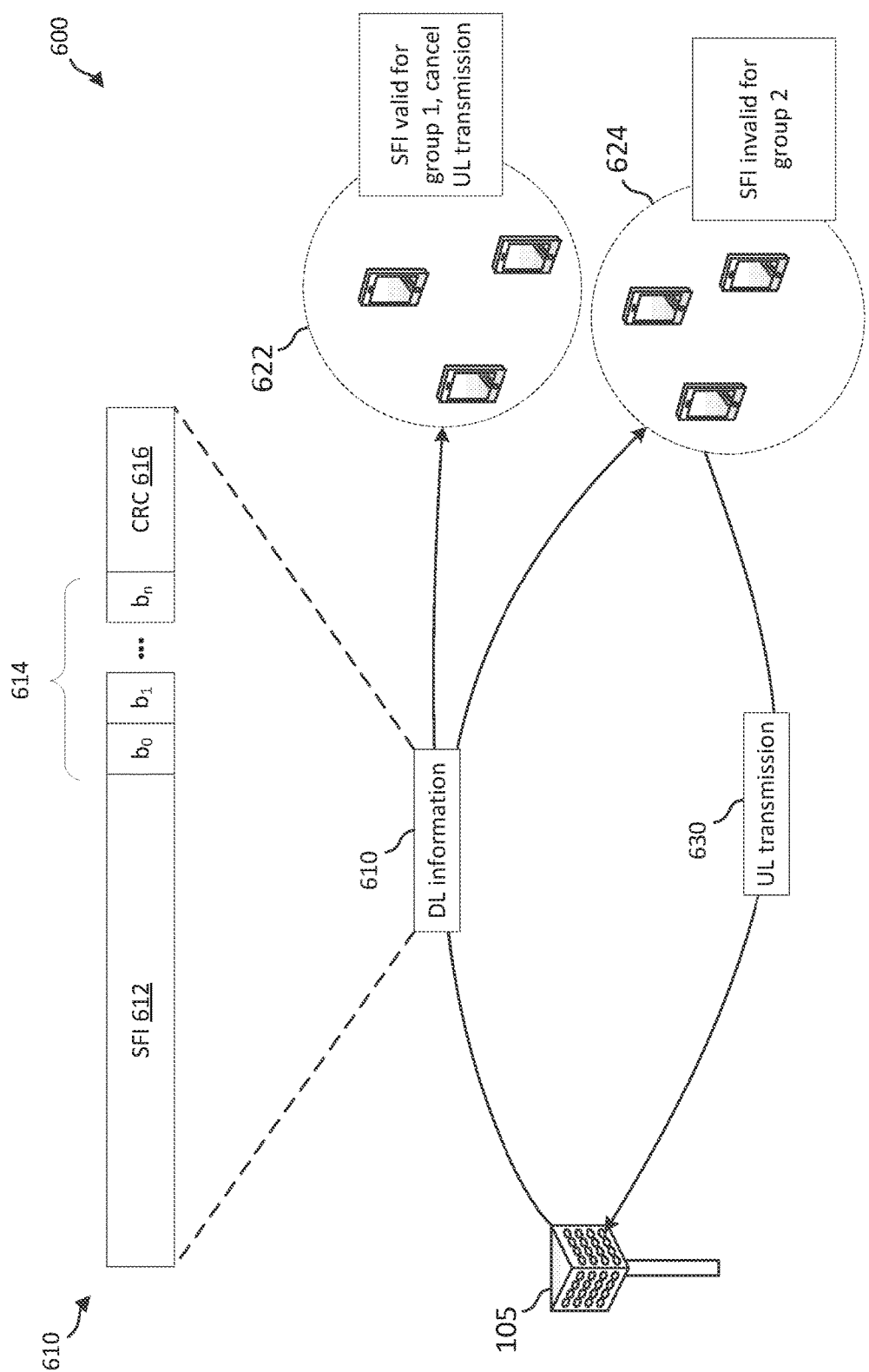
FIG. 6 illustrates a group-based SFI communication scheme for cancelling UL transmissions according to some aspects of the present disclosure.

FIG. 6 illustrates a group-based SFI communication scheme 600 for cancelling UL transmissions according to some aspects of the present disclosure. In the scheme 600, a BS 105, which may be one of the BSs 105 in the network 100, transmits DL information 610 to a first group of UEs 622 and a second group of UEs 624. The downlink information may include DCI, such as DCI 2.0, or any other suitable format of DCI. The DCI may be masked with an RNTI, such as a SFI-RNTI, or any other suitable type of RNTI. The BS 105 may transmit the DL information 610 over a control channel, such as a GC-PDCCH. In some aspects, all UEs of the first group 622 and the second group 624 are configured to monitor for the DL information 610 in the GC-PDCCH. Further, the UEs of both the first group 622 and the second group 624 may be configured with a RNTI, such as a SFI-RNTI, to decode and apply SFI received in the GC-PDCCH.

The DL information 610 includes a SFI 612, a validation field 614, and a cyclical redundancy check (CRC) 616. The SFI may indicate an index number associated with a slot format combination, as explained with respect to FIG. 5. The validation field 614 includes a plurality of validation portions or bits $b_0, b_1, \ldots b_n$. In some aspects, each validation portion or bit of the validation field 614 is associated with a different group or subgroup of UEs. For example, the validation bit $b_0$ may be associated with the first group of UEs 622, and the second validation bit $b_1$ may be associated with the second group of UEs 624. Although FIG. 6 illustrates each of the first group of UEs 622 and second group of UEs 624 including multiple UEs, it should be understood that in other examples a group or subgroup of UE can include one or more UEs. In one aspect, each validation bit may indicate whether the SFI 612 is valid for the associated group of UEs. For example, in one aspect, if the validation bit $b_0$ is a 1, the UE determines that the SFI 612 is valid for the first group of UEs 622. If the validation bit $b_1$ is a 1, the UE may determine that the SFI 612 is valid for the second group of UEs 624. However, in other aspects, a validation bit value of 0 may indicate that the SFI 612 is valid for the corresponding group of UEs. Accordingly, in some aspects, the validation field 614 comprises a bitmap where each bit of the bitmap is associated with a different UE or group of UEs. In some aspects, the BS may indicate that the SFI 612 is valid for only one group of UEs. For example, in some aspects, only one of the validation bits $b_0, b_1, \ldots b_n$ has a value of 1, while the remaining validation bits have values of 0. In other aspects, the BS may indicate that the SFI 612 is valid for two or more groups of UEs. In one aspect, the validation field 614 includes 2 validation bits, each associated with a respective group of UEs. However, other numbers of validation bits are contemplated by the present disclosure, including 1, 3, 4, 5, 8, 10, 15, 20, or any other suitable number of bits.

The BS 105 may configure each UE receiving the SFI to monitor for a specific bit or portion of the validation field 614. For example, the BS 105 may configure the first group of UEs 622 to monitor for the first validation bit $b_0$ of the validation field 614 and the second group of UEs 624 to monitor for the second validation bit $b_1$ of the validation field 614. The BS 105 may configure the UEs of each group to monitor for the respective validation bit using RRC messaging, media access control-control element (MAC-CE), or any other suitable mechanism. The BS 105 may determine which UEs are associated with each group based on one or more UE characteristics or parameters, such as traffic priority. For example, in one aspect, the first group of UEs 622 may include a high-priority group of UEs, and the second group of UEs 624 may include a low-priority, or lower-priority group of UEs. In some aspects, the BS 105 configures each UE using RRC with a parameter that indicates to the UE to monitor for or detect a particular validation bit (e.g., $b_0$, $b_1$) for SFI validation.

In the aspect shown in FIG. 6, the validation field 614 indicates that the SFI 612 is valid for the first group of UEs 622 and not the second group of UEs 624. Each UE of the first group of UEs 622 validates the first SFI 612, or determines that the SFI 612 is valid, and applies the SFI 612 to modify the UE's slot configuration or DL-UL configuration. Applying the SFI 612 may override one or more flexible symbols of the slot configuration to DL, where at least one of the flexible symbols is associated with a PUCCH occasion. In response to overriding or defining the direction of the at least one flexible symbol as DL, the UEs of the first group of UEs 622 cancel one or more UL transmissions scheduled in one or more time periods (e.g., PUCCH occasion) that include the flexible symbols overridden as DL. In contrast, the UEs of the second group of UEs 624 determine that the SFI 612 is not valid for the second group of UEs 624. In other words, the UEs of the second group 624 determine that no SFI validation has occurred. Accordingly, the second group of UEs 624 may proceed with the previously configured slot configuration to transmit the UL transmission 630 in the corresponding PUCCH occasion.

Accordingly, if the BS determines that there is no DL data scheduled in a SPS occasion for one or more UEs of the first group of UEs 622, the BS can transmit DL information 610 carrying the SFI 612 and validation field 614 indicating the SFI 612 is valid for the first group of UEs 622. To limit the overhead and undesirable cancellations of UL transmissions from other UEs (e.g., UEs of second group 624) which may have an UL transmission 630 to perform in the associated time period.

Figure 7:
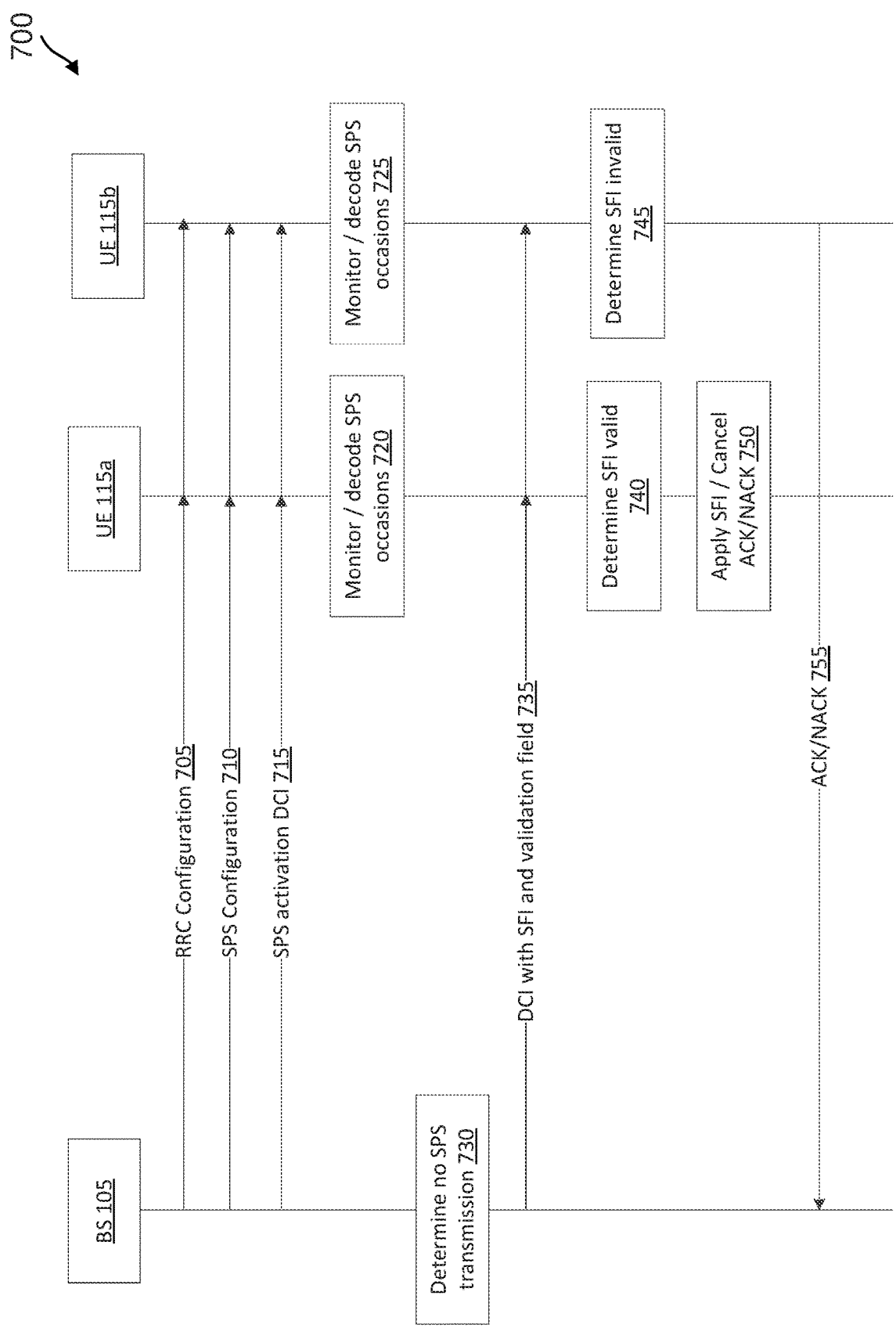
FIG. 7 is a signaling diagram of a group-based SFI communication scheme for cancelling UL transmissions according to some aspects of the present disclosure.

FIG. 7 is a signaling diagram of a group-based SFI communication scheme 700 for cancelling UL transmissions according to some aspects of the present disclosure. The method 700 may be performed by a BS 105, such as one of the BSs 105 in the network 100, a first UE 115a, and a second UE 115b, which may be UEs 115 of in the network 100. In some aspects, the method 700 may be used in an SPS communication scenario where the BS 105 has configured the UEs 115a, 115b to monitor for DL data in periodic time/frequency resources which may be referred to as SPS occasions or PDSCH occasions. In some aspects, the BS 105, the UE 115a, and the UE 115b may implement the method 700 in conjunction with the scheme 600.

In action 705, the BS 105 transmits an RRC configuration to the first UE 115a and the second UE 115b. The RRC configuration may define or set one or more parameters associated with the slot format or DL-UL communication scheme between the BS 105 and the UEs 115. The RRC configuration may be transmitted in a SIB message, such as SIB1. For example, the RRC configuration may include a static or semi-static DL-UL slot format configuration, which may be referred to as a TDD configuration, and which assigns a communication direction to a plurality of slots and/or individual symbols within the slots. For example, the BS 105 may transmit an RRC configuration defining one or more slots as DL slots, UL slots, and/or switching slots, where the switching slots include DL, UL and/or flexible symbols. The BS 105 may indicate the TDD configuration in an RRC message based on an identifier or index value associated with the TDD configuration. For example, the BS 105 may transmit a system information block (SIB) message, such as SIB1 indicating the TDD configuration.

In action 710, the BS 105 transmits a SPS configuration to the first UE 115a and the second UE 115b. As explained above with respect to FIG. 3, the BS 105 may transmit the SPS configuration using RRC signaling. The SPS configuration defines or allocates periodic time/frequency resources for the UEs 115 to receive DL data. In this regard, the SPS configuration defines a plurality of SPS occasions, which may be PDSCH occasions, that repeat with a SPS periodicity. In response to receiving and activating the SPS configuration, the UEs 115 may be configured to attempt to decode data in each SPS occasion, and send HARQ feedback based on the decoding, such as an ACK/NACK.

In action 715, the BS 105 transmits a SPS activation to activate the SPS configuration. In some aspects, the BS 105 may transmit the SPS activation in DCI. In some aspects, the BS 105 may separately configure the first UE 115a and the second UE 115b with separate TDD configurations, separate SPS configurations, and/or separate SPS activations.

In action 720, the first UE 115a, which may be associated with a first group of UEs, monitors for and attempts to decode DL data for one or more SPS occasions.

In action 725, the second UE 115b, which may be associated with a second group of UEs, monitors for and attempts to decode DL data for one or more SPS occasions.

In action 730, the BS 105 determines that there is no DL data scheduled in one or more SPS occasions for the first UE 115a.

In action 735, based on determining that there is no DL data scheduled in the one or more SPS occasions, the BS 105 transmits DL information, such as a DCI, which includes a SFI and validation field (e.g., the DL information 610 of FIG. 6) associated with the first UE 115a, which is associated with the first group of UEs. As similarly explained above, the SFI, if validated for a UE, may override one or more flexible symbols in which the UE 115a has scheduled an UL transmission. The validation field may include one or more validation portions or bits associated with one or more groups of UEs. For example, in one aspect, the validation field includes at least a first validation bit corresponding to the first UE 115a and first group of UEs, and a second validation bit corresponding to the second UE 115b and the second group of UEs. In some aspects, the validation field may include a bitmap where each bit of the bitmap is associated with a different UE or group of UEs.

The BS 105 may select or determine the SFI based on the first UE's TDD configuration, SPS configuration, and/or the determined empty SPS configuration. For example, the BS 105 may know the groups of symbols the first UE 115a uses for transmitting HARQ feedback for one or more of the SPS occasions, for example, based on a K1 parameter (that defines an offset between a PDSCH transmission and a corresponding HARQ ACK/NACK transmission). The BS 105 may determine that one or more of the symbols the first UE 115*a* allocates for UL transmissions such as HARQ feedback are flexible symbols. The BS 105 may determine or select a SFI that overrides as DL at least one of the flexible symbols allocated for HARQ feedback without modifying the statically configured DL and UL symbols of the UE's TDD configuration.

In some aspects, the DL information or DCI may further include a cyclical redundancy check (CRC) masked by a radio network temporary identifier (RNTI), such as a SFI-RNTI or any other suitable type of RNTI. The UEs 115 may be configured with the RNTI to decode the DL info.

In action 740, the first UE 115*a* receives and decodes the DL info and determines, based on the validation field, that the SFI is valid for the first UE 115*a*. For example, the UE 115*a* may determine that the SFI is valid based on a validation bit of the validation field that is associated with the first UE 115*a* or first group of UEs. For example, the first UE 115*a* may be configured to validate the SFI based on a first validation bit of the validation field. In some aspects, the first UE 115*a* determines that the SFI is valid for the first UE 115*a* or first group of UEs when the first validation bit value is 1. In other aspects, the first UE 115*a* determines that the SFI is valid for the first UE 115*a* or first group of UEs when the first validation bit value is 0.

In action 745, the second UE 115*b* receives and decodes the DL info and determines, based on the validation field, that the SFI is invalid for the second UE 115*b*. For example, the UE 115*b* may determine that the SFI is invalid based on a validation bit of the validation field that is associated with the second UE 115*b* or second group of UEs. For example, the second UE 115*b* may be configured to validate the SFI based on a second validation bit of the validation field. In some aspects, the second UE 115*b* determines that the SFI is invalid for the second UE 115*b* or second group of UEs when the second validation bit value is 0. In other aspects, the second UE 115*b* determines that the SFI is invalid for the second UE 115*a* or second group of UEs when the second validation bit value is 1.

In action 750, in response to determining that the SFI is valid, the first UE 115*a* applies the SFI to specify or override one or more flexible symbols as DL. As explained above, one or more of the overridden symbols may have been allocated or scheduled for an UL transmission, such as a HARQ feedback message (e.g., ACK/NACK). Based on overriding the one or more flexible symbols as DL, the first UE 115*a* cancels or drops the UL transmission, which was scheduled for a time period that includes the one or more overridden flexible symbols.

In action 755, the second UE 115*b*, which determined that the SFI was not valid and did not modify its slot configuration, proceeds according to the SPS and preconfigured slot configuration to transmit an UL transmission during the time period corresponding to the canceled UL transmission in action 750. For example, in some aspects, the BS 105 may have transmitted DL data to the second UE 115*b* during the same time period or SPS occasion for which there was do DL data transmitted to the first UE 115*a*.

Figure 8:
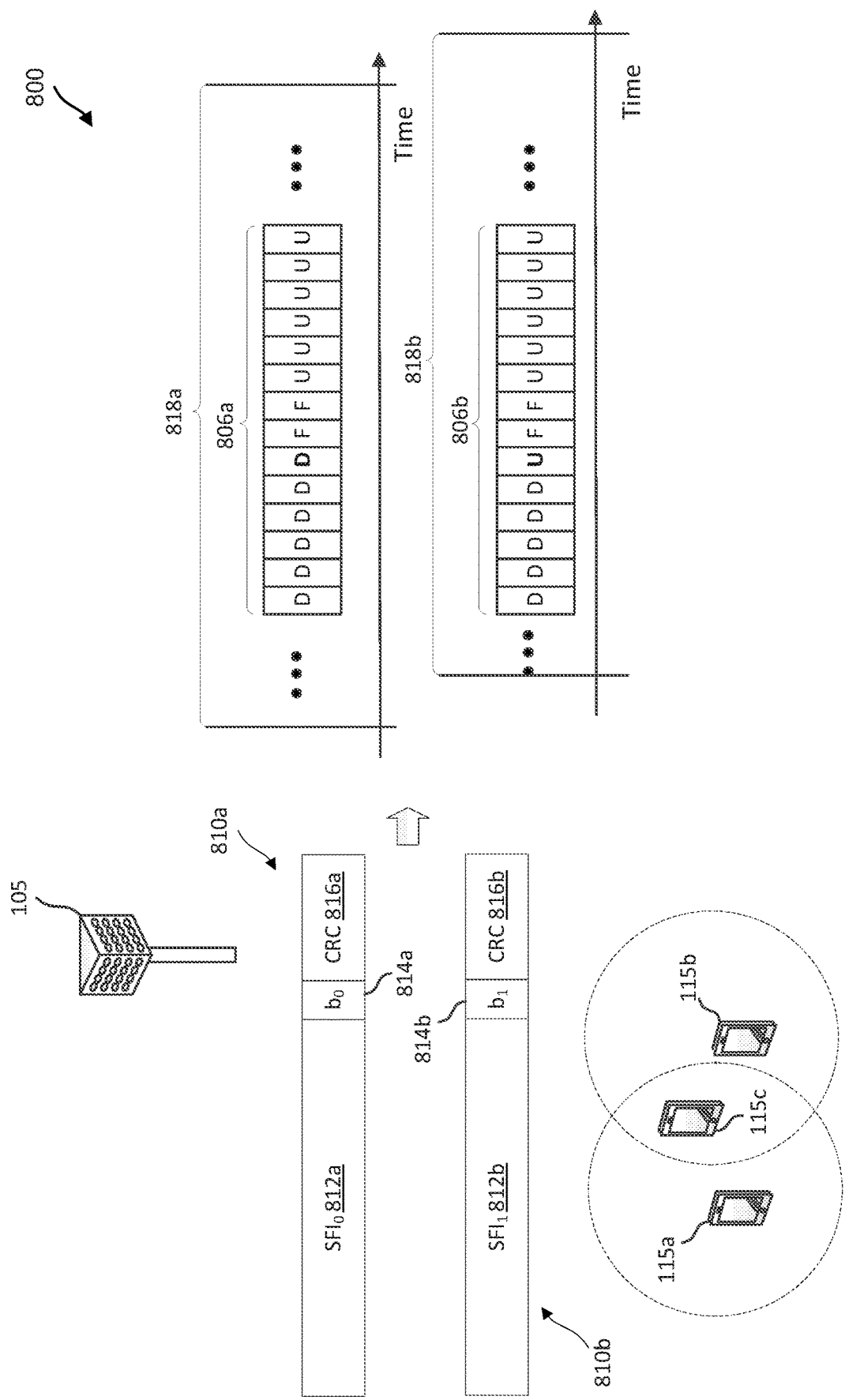
FIG. 8 illustrates a group-based, multi-SFI communication scheme for cancelling UL transmissions according to some aspects of the present disclosure.

FIG. 8 illustrates a group-based, multi-SFI communication scheme 800 for cancelling UL transmissions according to some aspects of the present disclosure. The scheme 800 is performed by a BS 105, a first UE 115*a*, a second UE 115*b*, and a third UE 115*c*. The BS 105 may be one of the BSs 105 in the network 100 shown in FIG. 1, and the first, second, and third UEs 115*a*, 115*b* may be UEs 115 of the network 100 shown in FIG. 1. Referring to FIG. 8, the first UE 115*a* may belong or correspond to a first group of UEs, the second UE 115*b* may correspond to a second group of UEs, and the third UE 115*c* may correspond to both the first group of UEs and the second group of UEs. In some aspects, the third UE 115*c* may belong to a third group of UEs, which is configured to monitor for DL info and/or DL data with both the first group of UEs and the second group of UEs.

In the scheme 800, the BS 105 transmits two sets of DL info 810*a*, 810*b*, to the UEs 115. In this regard, the first set of DL info 810*a* includes a SFI 812*a*, a validation field 814*a*, and a CRC 816*a*. Similarly, the second set of DL info 810*b* includes a SFI 812*b*, a validation field 814*b*, and a CRC 816*b*. In some aspects, first and second sets of DL info 810*a*, 810*b* may be carried in separate DCIs. In other aspects, the first and second sets of DL info 810*a*, 810*b* may be carried by a same DCI. In some aspects, the DCI may be a format 2.0 (also denoted as 2_0) DCI, a 2.X DCI, or any other suitable format of DCI. In some aspects, the BS 105 may transmit the first DL info 810 at a first time and the second DL info 810*b* at a different second time. In other aspects, the BS 105 may transmit both sets of DL info 810*a*, 810*b* at a same time, such as within a same slot or set of symbols, such as within a same GC-PDCCH. In some aspects, the BS 105 may transmit a single DCI carrying the first SFI 812*a*, the second SFI 812*b*, the first validation field 814*a*, and the second validation field 814*b*.

In some aspects, the BS 105 may determine that there is no DL data to transmit to the first UE 115*a* in a first SPS occasion, and that there is no DL data to transmit to the second UE 115*b* in a second SPS occasion. Accordingly, the BS 105 may transmit different SFIs 812 to each UE 115 to cancel UL transmissions for different time periods corresponding to different SPS occasions. FIG. 8 shows slot format combinations 818*a*, 818*b* associated with the first SFI 812*a* and the second SFI 812*b*, respectively. Each of the slot format combinations 818*a*, 818*b* includes a DL/UL/Flexible symbol pattern for a slot 806*a*, 806*b*. The slots 806*a*, 806*b* may correspond to different time periods, a same time period, or partially overlapping time periods. The patterns of each slot 806*a*, 806*b* have at least one different symbol, where the pattern of the first slot 806*a* overrides a flexible symbol as DL, and the pattern of the second slot 806*b* overrides a flexible symbol as UL. For instance, if a UE 115 has scheduled an UL transmission for one or more symbols including the overridden symbol, the UL transmission would be canceled in the first slot 806*a*, but not the second slot 806*b*.

The third UE 115*c* may be configured to validate the first SFI 812*a* and the second SFI 812*b*. Accordingly, in the scheme 800 shown in FIG. 8, there may be a conflict to resolve regarding which of the SFIs 812 to apply. The present disclosure describes conflict resolution configurations and mechanisms to address these conflicts. For example, in one aspect, if the third UE 115*c* receives and validates different SFIs to apply to a particular time period, the third UE 115*c* may be configured to apply the earlier received SFI, which is the SFI 812*a*. In other aspects, the third UE 115*c* may be configured to apply the later received SFI 812*b*. In another aspect, the UE 115*c* is configured to apply the SFI 812 having the lowest index number. In another aspect, the UE 115*c* is configured to apply the SFI 812 having the highest index number. In another aspect, the UE 115*c* is configured to apply the SFI having the lower size (e.g., in bits), or the greater size. However, it will be understood that these examples are not limiting and that other conflict resolution configurations are contemplated by the present disclosure.

In another aspect, the BS 105 may be configured to select and transmit SFIs such that no conflicts occur. For example, in some aspects, the BS 105 may be configured to transmit only one SFI associated with each SFI period. In another aspect, the BS 105 may be configured to select and transmit SFIs for overlapping time periods such that the same DL-UL symbol patterns are used for overlapping slots of the SFI.

Figure 9:
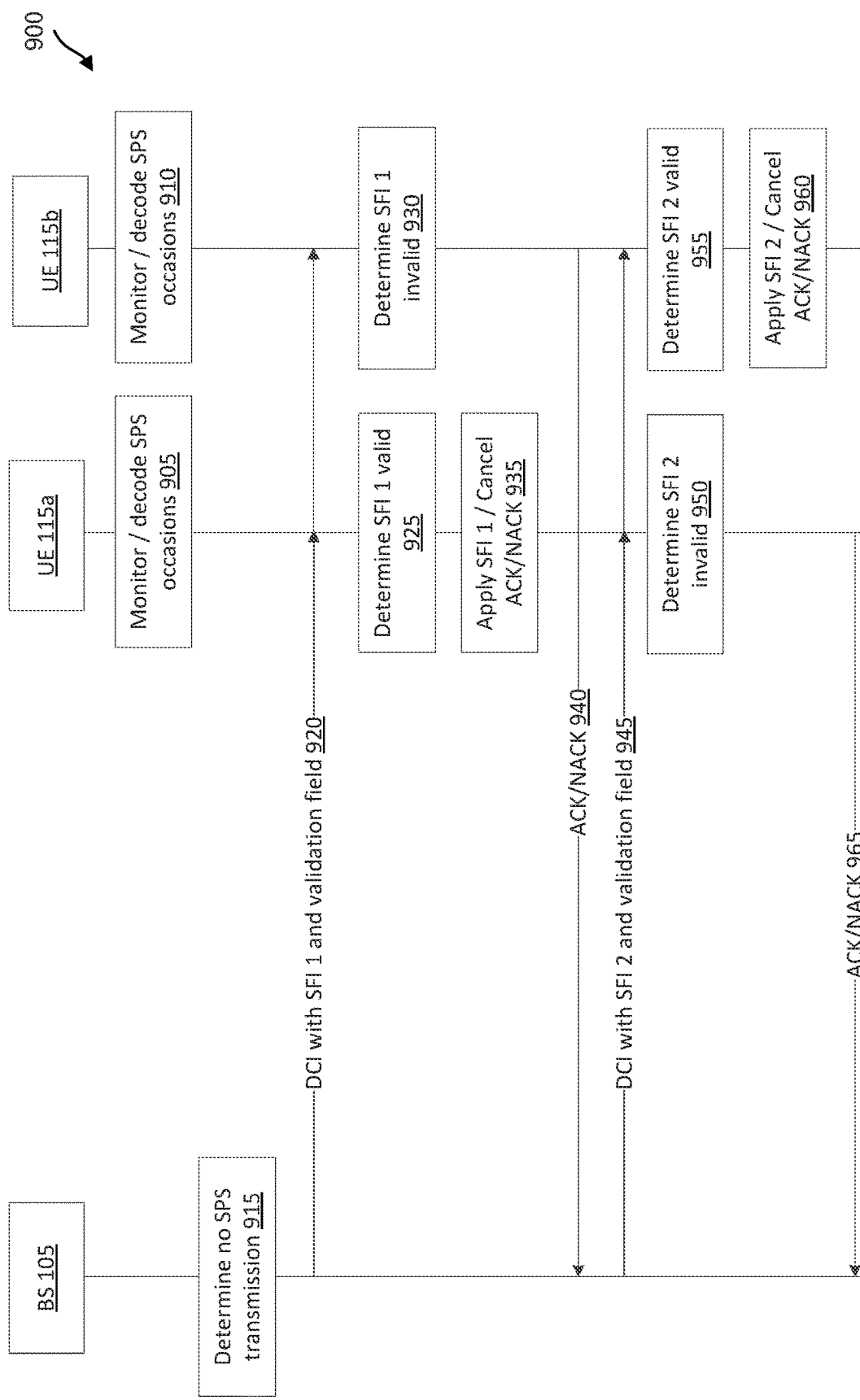
FIG. 9 is a signaling diagram of a group-based, multi-SFI communication scheme for cancelling UL transmissions according to some aspects of the present disclosure.

FIG. 9 is a signaling diagram of a group-based, multi-SFI communication scheme 900 for cancelling UL transmissions according to some aspects of the present disclosure. The method 900 may be performed by a BS 105, such as one of the BSs 105 in the network 100, a first UE 115*a*, and a second UE 115*b*, which may be UEs 115 of in the network 100. In some aspects, the method 900 may be used in an SPS communication scenario where the BS 105 has configured the UEs 115*a*, 115*b* to monitor for DL data in periodic time/frequency resources which may be referred to as SPS occasions or PDSCH occasions. In some aspects, the BS 105, the UE 115*a*, and the UE 115*b* may implement the method 700 in conjunction with the scheme 600 and the method 700.

In action 905, the first UE 115*a*, which may be associated with a first group of UEs, monitors for and attempts to decode DL data for one or more SPS occasions.

In action 910, the second UE 115*b*, which may be associated with a second group of UEs, monitors for and attempts to decode DL data for one or more SPS occasions.

In action 915, the BS 105 determines that there is no DL data scheduled in one or more SPS occasions for the first UE 115*a*.

In action 920, based on determining that there is no DL data scheduled in the one or more SPS occasions, the BS 105 transmits first DL information, such as a DCI, which includes a first SFI and first validation field (e.g., the DL information 610 of FIG. 6) associated with the first UE 115*a*, which is associated with the first group of UEs.

In action 925, the first UE 115*a* receives the first DL info and determines, based on the first validation field, that the first SFI is valid. As explained above, in some aspects, the validation field may comprise a plurality of bits having a value indicating whether the SFI is valid for a given UE.

In action 930, the second UE 115*b* receives the first DL info and determines, based on the first validation field, that the first SFI is invalid. For example, in some aspects, the second UE 115*b* determines that the value of the first validation field is different from a configured validation value.

In action 935, the first UE 115*a*, in response to validating the first SFI, applies the first SFI to modify the first UE's TDD configuration and cancels at least one ACK/NACK transmission. In some aspects, applying the first SFI includes overriding one or more flexible symbols of the first UE's slot configuration to a DL symbol or an UL symbol. The first SFI overrides at least one flexible symbol as a DL symbol. For example, in some aspects, the at least one flexible symbol may be in a switching slot, and may be within a group of symbols allocated for PUCCH communications. By overwriting the at least one slot as DL, any PUCCH communications scheduled in that symbol are dropped or canceled. Accordingly, although the first UE 115*a* may have been unsuccessful at decoding DL data in a corresponding empty SPS occasion, the first UE 115*a* can cancel the NACK transmission by applying the first SFI.

In action 940, the second UE 115*b*, which determined that the first SFI was invalid in action 930 and therefore did not apply the first SFI, proceeds according to its semi-static slot configuration and transmits a corresponding ACK/NACK based on decoding a previous corresponding SPS occasion.

The BS 105 may select or determine the SFI based on the first UE's slot configuration (e.g., TDD configuration), SPS configuration, and/or the determined empty SPS occasion. For example, the BS 105 may know the groups of symbols the first UE 115*a* uses for transmitting HARQ feedback for one or more of the SPS occasions. The BS 105 may determine that one or more of the symbols the first UE 115*a* allocates for UL transmissions such as HARQ feedback are flexible symbols. The BS 105 may determine or select a SFI that overrides as DL at least one of the flexible symbols allocated for HARQ feedback without modifying the statically configured DL and UL symbols of the UE's TDD configuration.

In some aspects, the DL info may further include a cyclical redundancy check (CRC) masked or scrambled by a radio network temporary identifier (RNTI), such as a SFI-RNTI or any other suitable type of RNTI. The UEs 115 may be configured with the RNTI to decode the DL info.

In action 945, based on determining that there is no DL data scheduled in the one or more SPS occasions, the BS 105 transmits second DL information, such as a DCI, which includes a second SFI and second validation field associated with the second UE 115*b*, which is associated with the second group of UEs. The second validation field includes at least a second validation bit corresponding to the second UE 115*a* and second group of UEs.

In action 950, the first UE 115*a* receives the second DL info and determines, based on the second validation field, that the second SFI is invalid. As explained above, in some aspects, the second validation field may comprise a plurality of bits having a value indicating whether the second SFI is valid for a given UE.

In action 955, the second UE 115*b* receives the second DL info and determines, based on the second validation field, that the second SFI is valid.

In action 960, the second UE 115*b*, in response to validating the second SFI, applies the second SFI to modify the second UE's slot configuration and cancels at least one ACK/NACK transmission. In some aspects, applying the second SFI includes overriding one or more flexible symbols of the second UE's slot configuration to a DL symbol or an UL symbol. In the method 900, the second SFI overrides at least one flexible symbol as a DL symbol. For example, in some aspects, the at least one flexible symbol may be in a switching slot, and may be within a group of symbols allocated for PUCCH communications. By overwriting the at least one slot as DL, any PUCCH communications scheduled in that symbol are dropped or canceled. Accordingly, although the second UE 115*b* may have been unsuccessful at decoding DL data in a corresponding empty SPS occasion, the second UE 115*b* can cancel the NACK transmission by applying the second SFI.

In action 965, the first UE 115*a*, which determined that the second SFI was invalid in action 950 and therefore did not apply the second SFI, proceeds according to its semi-static slot configuration and transmits a corresponding ACK/NACK based on decoding a previous corresponding SPS occasion.

Figure 10:
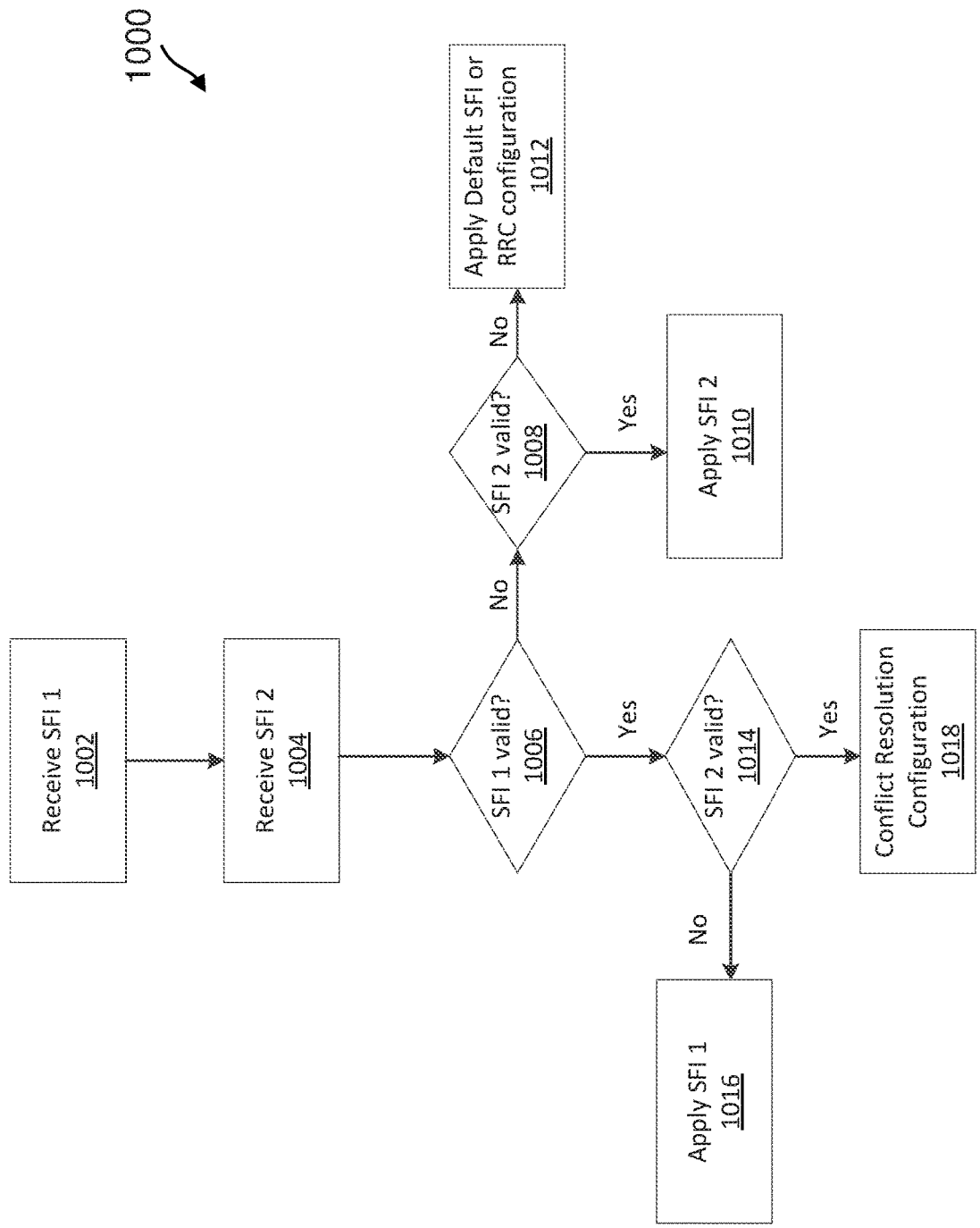
FIG. 10 is a flow diagram of a method for resolving conflicts in a group-based, multi-SFI scheme for cancelling UL transmissions according to some aspects of the present disclosure.

FIG. 10 is a flow diagram of a method 1000 for resolving conflicts in a group-based, multi-SFI scheme for cancelling UL transmissions according to some aspects of the present disclosure. The method 1000 may be performed by a UE 115, such as a UE 115 of the network 100. The method 1000 may include steps and actions similar or identical to the actions of the methods 700 and 900, shown in FIGS. 7 and 9. In some aspects, the method 1000 may be performed by a UE configured to monitor for DL data using SPS, and configured with a SFI-RNTI to monitor for SFIs. In particular, the method 1000 may include mechanisms for resolving conflicts associated with receiving and applying SFI. For example, in some aspects, a UE may be configured to select a SFI or slot configuration when two or more SFIs are received and validated for a given time period. In another aspect, the UE may be configured to determine a slot configuration when no SFI validation has occurred.

In block 1002, the UE receives a first SFI (SFI 1). As explained above, in some aspects, the UE is configured to receive the first SFI in a DCI which includes the SFI, a validation field, and a CRC. In one example, the DCI is a DCI format 2.0, or similar to 2.0, which may have a maximum payload size of 128 bits. In other aspects, the DCI is a format different from 2.0, such as a 2.X format, and includes a maximum payload size of more than 128 bits. In some embodiments, the first SFI is transmitted in a shared control channel, such as a GC-PDCCH, and the UE is configured to monitor for and decode the first SFI. In some aspects, the UE is configured with a SFI-RNTI, or any other suitable type of RNTI.

In block 1004, the UE receives a second SFI (SFI 2). In some aspects, the UE is configured to receive the second SFI in a DCI which includes the SFI, a validation field, and a CRC. In one example, the DCI is a DCI format 2.0, or similar to DCI 2.0, which may have a maximum payload size of 128 bits. In other aspects, the DCI is a format different from 2.0, such as a 2.X format, and includes a maximum payload size of more than 128 bits. In some embodiments, the second SFI is transmitted in a shared control channel, such as a GC-PDCCH, and the UE is configured with an RNTI to monitor for and decode the second SFI. In some aspects, the UE is configured with a SFI-RNTI, or any other suitable type of RNTI.

In some aspects, the UE receives the first SFI and second SFI at different times, such as different PDCCH instances. In other aspects, the UE may receive the first SFI and the second SFI at a same time, such as in a same PDCCH instance. In some aspects, the first SFI and second SFI are associated with time periods that at least partially overlap. For example, in one aspect, both the first SFI and the second SFI define a DL/UL direction for one or more same symbols within a slot. The BS transmits each of the first SFI and the second SFI with a corresponding validation field indicating whether the SFI is valid for one or more UEs, or one or more groups of UEs.

In action 1006, the UE determines whether the first SFI is valid based on the first validation field. In some aspects, the UE is configured to compare a value of the first validation field with a stored or configured value. In some aspects, if the first validation field value matches the configured value, the UE may determine that the first SFI is valid; if the first validation field value does not match the stored or configured value, the UE may determine that the first SFI is not valid.

In action 1008, in response to determining that the first SFI is not valid, the UE determines whether the second SFI is valid based on the second validation field. The UE may perform the validation of action 1008 similarly or identical to performing the validation of action 1010.

In action 1010, in response to determining that the second SFI is valid, and the first SFI is not valid, the UE applies the second SFI (SFI 2) to modify the UE's slot configuration. In some aspects, applying the second SFI includes overriding one or more flexible symbols of the second UE's slot configuration to a DL symbol or an UL symbol. In the method 1000, the second SFI may override at least one flexible symbol as a DL symbol. For example, in some aspects, the at least one flexible symbol may be in a switching slot, and may be within a group of symbols allocated for PUCCH communications. By overwriting the at least one slot as DL, any PUCCH communications scheduled in that symbol are dropped or canceled. Accordingly, although the UE may have been unsuccessful at decoding DL data in a corresponding empty SPS occasion, the UE can cancel the NACK transmission by applying the second SFI.

In action 1012, in response to determining that neither the second SFI nor the first SFI is valid, the UE is configured to apply a default SFI or default slot configuration. In some aspects, in action 1012, the UE applies a SFI of value 255, which may include the UE determining the slot format for the slot based on RRC parameters such as tdd-UL-DL-ConfigurationCommon, tdd-ULDL-ConfigurationDedicated and/or detected DCI formats. In some embodiments, action 1012 includes the UE determining or assuming that no SFI has been received, and cancelling UL transmissions associated with at least one SPS occasion. For example, the UE may be configured to continue monitoring for DL data in the SPS occasions and for SFI, but if no SFI validation occurs for the UE, the UE refrains from performing one or more UL transmissions.

In action 1014, in response to determining that the first SFI is valid, the UE determines whether the second SFI is valid based on the second validation field, similarly to action 1008. It will be understood that action 1014 may be performed when the first SFI and the second SFI are associated with a time period that at least partially overlaps.

In action 1016, in response to determining that the second SFI is invalid, but the first SFI is determined to be valid, the UE applies the first SFI. If the first SFI overrides one or more flexible symbols as DL, where an UL transmission was scheduled for the one or more overridden symbols, the UE can cancel or drop the UL transmission.

In block 1018, in response to determining that the second SFI is valid in addition to the first SFI being determined valid, the UE is configured to apply a conflict resolution rule. It will be understood that block 1018 may be performed when the both first SFI and the second SFI are associated with a time period that at least partially overlaps, such that there could be a conflict in applying different SFIs to a same slot or symbol. In some embodiments, the BS may configure the UE to follow the conflict resolution rule. For example, the BS may configure the UE to select and apply the SFI that was received earliest or latest. In other aspects, the BS may configure the UE to select and apply the SFI of the smaller payload size, or the larger payload size. In other aspects, the BS may configure the UE to select and apply the SFI of the larger index value, or the smaller index value. In other aspects, the BS may configure the UE with a default SFI in the event that more than one SFI are validated for a given time period.

As explained above, in other aspects, the BS may be configured to determine and transmit SFIs to the UE such that no SFI conflicts occur. For example, the BS may ensure that only one SFI associated with a given time period (e.g., group of slots) is transmitted. In other aspects, the BS may select and transmit SFIs such that any the slot formats for any overlapping slots are the same.

In some aspects, a BS 105 and a UE 115 may utilize any suitable combination of the scheme 600 of FIG. 6, the method 700 of FIG. 7, the scheme 800 of FIG. 8, the method 900 of FIG. 9, and/or the method 1000 of FIG. 10 to perform SFI communication and/or SFI validation. Additionally, although FIGS. 6-10 are discussed in the context of utilizing SFI and SFI validation to cancel an HARQ ACK/NACK transmission in a group of symbols, similar mechanisms may be applied to cancel any UL transmission in one or more symbols.

Figure 11:
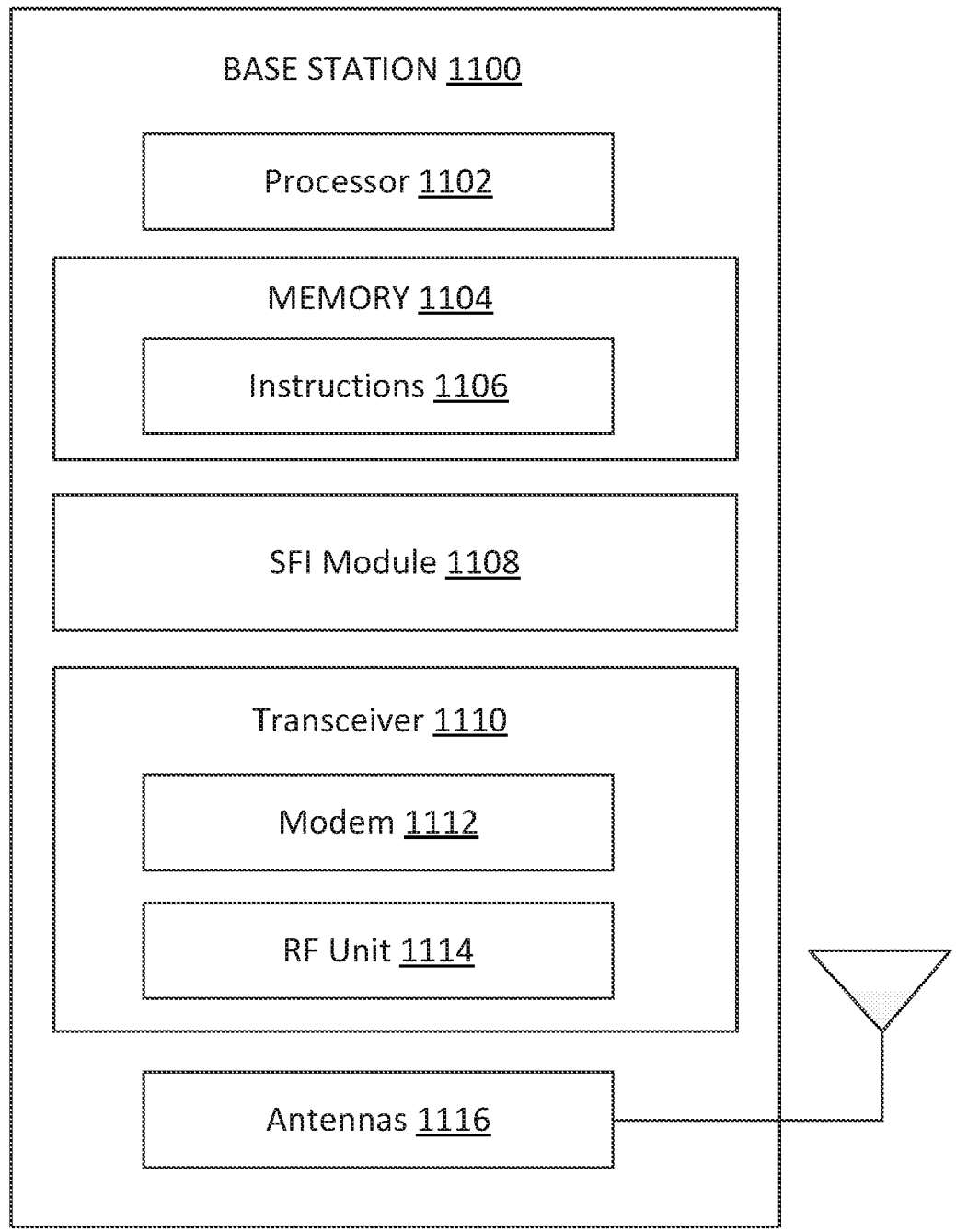
FIG. 11 illustrates a block diagram of a base station (BS) according to some aspects of the present disclosure.

FIG. 11 is a block diagram of an exemplary BS 1100 according to some aspects of the present disclosure. The BS 1100 may be a BS 105 as discussed in FIGS. 1-6 and 8-11. A shown, the BS 1100 may include a processor 1102, a memory 1104, a SFI module 1108, a transceiver 1110 including a modem subsystem 1112 and a RF unit 1114, and one or more antennas 1116. These elements may be in direct or indirect communication with each other, for example via one or more buses.

The processor 1102 may have various features as a specific-type processor. For example, these may include a CPU, a DSP, an ASIC, a controller, a FPGA device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1104 may include a non-transitory computer-readable medium. The memory 1104 may store instructions 1106. The instructions 1106 may include instructions that, when executed by the processor 1102, cause the processor 1102 to perform operations described herein, for example, aspects of FIGS. 2-6, 9, and 11. Instructions 1106 may also be referred to as program code. The program code may be for causing a wireless communication device to perform these operations, for example by causing one or more processors (such as processor 1102) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The SFI module 1108 may be implemented via hardware, software, or combinations thereof. For example, the SFI module 1108 may be implemented as a processor, circuit, and/or instructions 1106 stored in the memory 1104 and executed by the processor 1102. In some examples, the SFI module 1108 can be integrated within the modem subsystem 1112. For example, the SFI module 1108 can be implemented by a combination of software components (e.g., executed by a DSP or a general processor) and hardware components (e.g., logic gates and circuitry) within the modem subsystem 1112.

The SFI module 1108 may communicate with one or more components of BS 1100 to implement various aspects of the present disclosure, for example, aspects of FIGS. 5-10.

For instance, the SFI module 1108 may be configured to cause the transceiver 1110 to transmit first downlink information including first slot format indicator (SFI) and validation field indicating first SFI is invalid for first group of user equipments (UEs) and valid for second group of UEs. In some aspects, the first group of UEs includes a high-priority group of UEs, and the second group of UEs includes a low-priority group of UEs. In some aspects, the SFI module 1108 is configured to cause the transceiver 1110 to transmit the first downlink information by transmitting, in a group common-physical downlink control channel (GC-PDCCH), the first downlink information including the first SFI and the validation field. In some aspects, the SFI module 1108 is configured to transmit, at a first time, the first downlink information including the first SFI, where the first SFI is associated with a first period. In some aspects, the SFI module 1108 is further configured to cause the transceiver 1110 to transmit, at a second time different from the first time, second downlink information including a second SFI and a second validation field for the second SFI, where the second SFI is associated with a second period at least partially overlapping with the first period. In some aspects, the method 1300 further includes transmitting, to at least one of the first group of UEs or the second group of UEs, a conflict resolution configuration indicating an instruction to select the first SFI is both the first SFI and the second SFI are validated.

The SFI module 1108 may be further configured to cause the transceiver 1110 to receive, from at least a first UE of a first group of UEs, a UL transmission based on the first SFI being invalid for the first group of UEs. In some aspects, the SFI module 11108 is further configured to cause the transceiver 1110 to transmit, to the first UE, a semi-persistent scheduling (SPS) configuration indicating a plurality of downlink (DL) SPS occasions. In some aspects, the SFI module 1108 is configured to cause the transceiver 1110 to receive, from the first UE, an acknowledgement/negative-acknowledgment (ACK/NACK) for a DL communication signal in a first DL SPS occasion of the plurality of DL SPS occasions. In some aspects, the first SFI is associated with a time period, and the SFI module 1108 is further configured to refrain from monitoring for an UL transmission from the second group of UEs during the time period based on the first SFI being valid for the second group of UEs. In another aspect, the SFI module 1108 is configured to: cause the transceiver 1110 to transmit, to a second UE of the second group of UEs, a second SPS configuration indicating a second plurality of DL SPS occasions; cancel a DL transmission in a first DL SPS occasion of the second plurality of DL SPS occasions; and determine, based at least in part on cancelling the DL transmission in the first DL SPS occasion of the second plurality of DL SPS occasions, the first SFI and that the first SFI is valid for the second group of UEs.

In some aspects, the SFI module 1108 is further configured to generate the first downlink information based on a radio network temporary identifier (RNTI) associated with a SFI validation. In some aspects, the SFI module 1108 is further configured to cause the transceiver 1110 to transmit a first slot configuration indicating either an UL direction or a flexible symbol for at least a first symbol. In some aspects, the first SFI is associated with a second slot configuration, where the first SFI indicates a DL direction for at least the first symbol. In some aspects, the SFI module 1108 is configured to cause the transceiver 1110 to receive, from at least the first UE of the first group in one or more symbols including at least the first symbol, the UL transmission. In some aspects, the SFI module 1108 is configured to cause the transceiver 1110 to transmit, to the UE, a second SFI. In some aspects, the SFI module 1108 is configured to cause the transceiver 1110 to transmit, to the UE, a radio resource control (RRC) configuration, where the RRC configuration includes the first slot configuration, and where the first slot configuration indicates a flexile symbol for the at least the first symbol As shown, the transceiver 1110 may include the modem subsystem 1112 and the RF unit 1114. The transceiver 1110 can be configured to communicate bi-directionally with other devices, such as the UEs 115 and/or 800 and/or another core network element. The modem subsystem 1112 may be configured to modulate and/or encode data according to a MCS, e.g., a LDPC coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data (e.g., RRC configurations, SPS configurations, activations, reactivations, and releases, and PDSCH data, DCI) from the modem subsystem 1112 (on outbound transmissions) or of transmissions originating from another source such as a UE 115 and/or UE 1200. The RF unit 1114 may be further configured to perform analog beamforming in conjunction with the digital beamforming. Although shown as integrated together in transceiver 1110, the modem subsystem 1112 and/or the RF unit 1114 may be separate devices that are coupled together at the BS 1100 to enable the BS 1100 to communicate with other devices.

The RF unit 1114 may provide the modulated and/or processed data, e.g. data packets (or, more generally, data messages that may contain one or more data packets and other information), to the antennas 1116 for transmission to one or more other devices. The antennas 1116 may further receive data messages transmitted from other devices and provide the received data messages for processing and/or demodulation at the transceiver 1110. The transceiver 1110 may provide the demodulated and decoded data (e.g., HARQ ACK/NACK, etc.) to the SFI module 1108 for processing. The antennas 1116 may include multiple antennas of similar or different designs in order to sustain multiple transmission links.

In an example, the transceiver 1110 is configured to communicate with one or more components of the BS 1100 to transmit, to a UE 115, first downlink information including a first slot format indicator (SFI) and a first validation field indicating the first SFI is invalid for a first group of UEs and valid for a second group of UEs. The transceiver 110 may be further configured to receive, from at least a first UE of a first group of UEs, a UL transmission based on the first SFI being invalid for the first group of UEs.

In an aspect, the BS 1100 can include multiple transceivers 1110 implementing different RATs (e.g., NR and LTE). In an aspect, the BS 1100 can include a single transceiver 1110 implementing multiple RATs (e.g., NR and LTE). In an aspect, the transceiver 1110 can include various components, where different combinations of components can implement different RATs.

Figure 12:
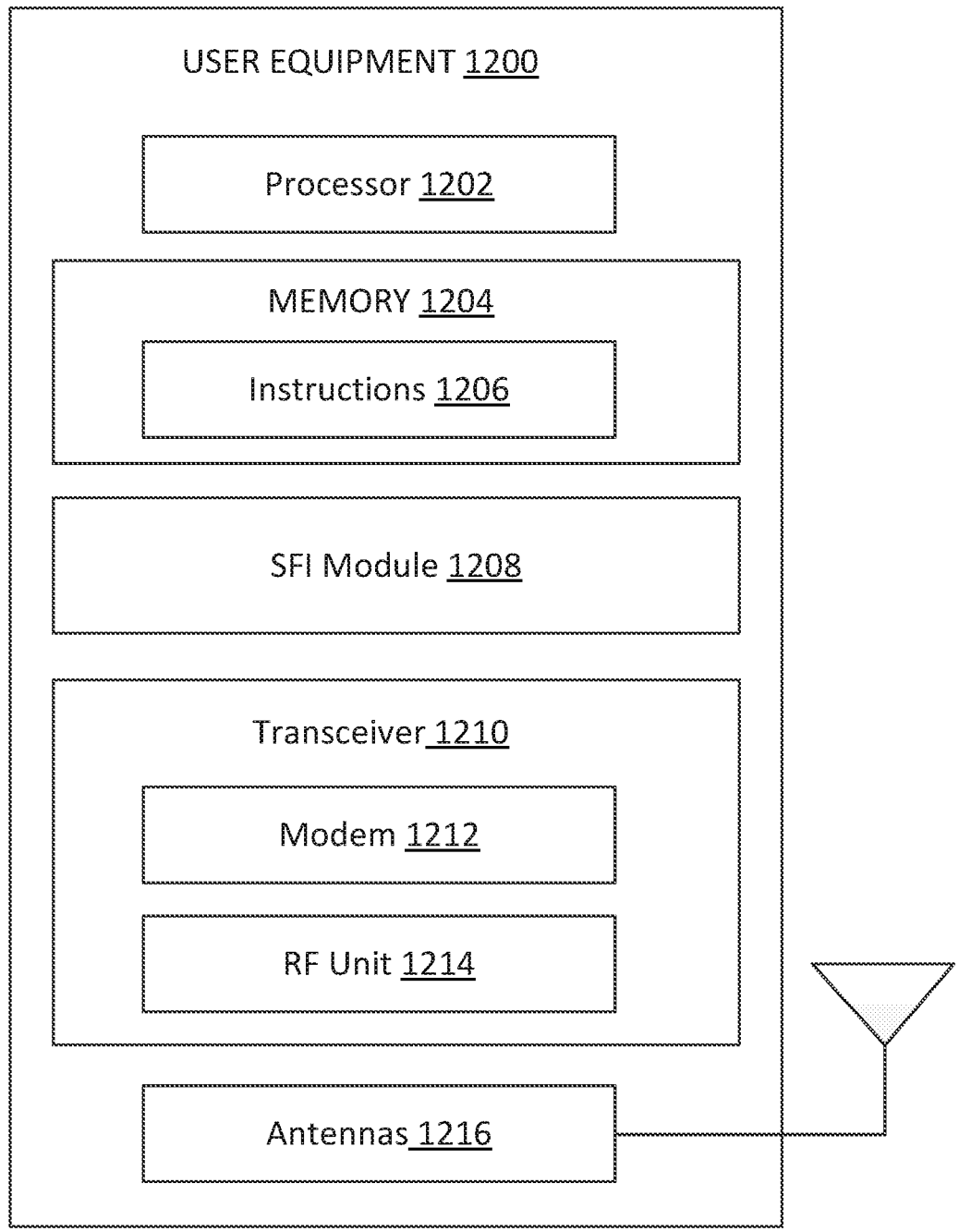
FIG. 12 illustrates a block diagram of a user equipment (UE) according to some aspects of the present disclosure.

FIG. 12 is a block diagram of an exemplary UE 1200 according to some aspects of the present disclosure. The UE 1200 may be a UE 115 as discussed above in FIGS. 1 and 15. As shown, the UE 1200 may include a processor 1202, a memory 1204, a SFI module 1208, a transceiver 1210 including a modem subsystem 1212 and a radio frequency (RF) unit 1214, and one or more antennas 1216. These elements may be in direct or indirect communication with each other, for example via one or more buses.

The processor 1202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1204 includes a non-transitory computer-readable medium. The memory 1204 may store, or have recorded thereon, instructions 1206. The instructions 1206 may include instructions that, when executed by the processor 1202, cause the processor 1202 to perform the operations described herein with reference to the UE 115 in connection with aspects of the present disclosure, for example, aspects of FIGS. 5-10. Instructions 1206 may also be referred to as code, which may be interpreted broadly to include any type of computer-readable statement(s) as discussed above.

The SFI module 1208 may be implemented via hardware, software, or combinations thereof. For example, the SFI module 1208 may be implemented as a processor, circuit, and/or instructions 1206 stored in the memory 1204 and executed by the processor 1202. In some instances, the SFI module 1208 can be integrated within the modem subsystem 1212. For example, the SFI module 1208 can be implemented by a combination of software components (e.g., executed by a DSP or a general processor) and hardware components (e.g., logic gates and circuitry) within the modem subsystem 1212.

The SFI module 1208 may communicate with one or more components of UE 1200 to implement various aspects of the present disclosure, for example, aspects of FIGS. 5-10. For instance, the SFI module 1208 may be configured to determine that an UL transmission is configured for a first time period, and monitor for a SFI validation associated with the first time period. The SFI module 1208 may be further configured to determine, based at least in part on the monitoring, whether to transmit the UL transmission during the first time period. In some aspects, the SFI module 1208 is configured to monitor for the SFI validation by causing the transceiver 1210 to receive, from a BS, first downlink information including a first SFI and a validation field associated with the first SFI. In some aspects, the SFI module 1208 may be configured to determine whether to transmit the UL transmission be determining, based on the validation field, whether the SFI is valid, and refraining, in response to determining that the first SFI is valid, from transmitting the UL transmission.

In some aspects, the SFI module 1208 is further configured to cause the transceiver 1210 to receive, from the BS, a semi-persistent scheduling (SPS) configuration indicating a plurality of downlink (DL) SPS occasions. In some aspects, the SFI module 1208 is configured to refrain from transmitting an acknowledgement/negative-acknowledgement (ACK/NACK) for a first DL SPS occasion of the plurality of DL SPS occasions. In some aspects, the SFI module 1208 is configured to determine that the first SFI indicates a downlink direction for at least a first symbol, and the refraining from transmitting the UL transmission includes refraining from transmitting the UL transmission in one or more symbols including the first symbol in response to determining that the first SFI indicates the downlink direction for at least the first symbol. In some aspects, the first SFI is associated with a group of UEs, and the validation field includes a first validation portion associated with a subgroup of the group of UEs. In some aspects, the validation field includes a bitmap, and each bit of the bitmap is associated with a different group of subgroup of the UEs. For example, in some aspects, a first bit of the validation field is associated with a high-priority subgroup of UEs, and a second bit of the validation field is associated with a low-priority subgroup of UEs. In some aspects, the SFI module 1208 is configured to decode the first downlink information based on a radio network temporary identifier (RNTI) associated with the SFI validation.

In some aspects, the SFI module 1208 is configured to cause the transceiver 1210 to receive, at a first time, the first downlink information including the first SFI, where the first SFI is associated with a first period. In another aspect, the SFI module 1208 is configured to: cause the transceiver 1210 to receive, from the BS at a second time different form the first time, second downlink information including a second SFI and a second validation field for the second SFI, where the second SFI is associated with a second period at least partially overlapping with the first period; and determine, based on the second validation field, whether the second SFI is valid. In another aspect, the SFI module 1208 is configured to refrain, in response to determining that the second SFI is valid, from transmitting the UL transmission during an overlapping period between the first period and the second period. In another aspect, the SFI module 1208 is configured to select, in response to determining that the first SFI and the second SFI are valid, the first SFI. In another aspect, the SFI module 1208 is configured to cause the transceiver 1210 to receive a conflict resolution configuration. In another aspect, the SFI module 1208 is configured to select the first SFI by selecting the first SFI based on the conflict resolution configuration.

In another aspect, the SFI module 1208 is further configured to determine, based on the monitoring, that the SFI validation has not occurred. In some aspects, the SFI module 1208 is configured to determine to transmit the UL transmission based on a default slot configuration in response to determining that the SFI validation has not occurred. In some aspects, the SFI module 1208 is configured to: determine, based on the monitoring, that the SI validation has not occurred; and refrain, based on determining that the SFI validation has not occurred, from transmitting the UL transmission.

As shown, the transceiver 1210 may include the modem subsystem 1212 and the RF unit 1214. The transceiver 1210 can be configured to communicate bi-directionally with other devices, such as the BSs 105 and 1100. The modem subsystem 1212 may be configured to modulate and/or encode the data from the memory 1204 and/or the SFI module 1208 according to a modulation and coding scheme (MCS), e.g., a low-density parity check (LDPC) coding scheme, a turbo coding scheme, a convolutional coding scheme, a digital beamforming scheme, etc. The RF unit 1214 may be configured to process (e.g., perform analog to digital conversion or digital to analog conversion, etc.) modulated/encoded data (e.g., HARQ ACK/NACK) from the modem subsystem 1212 (on outbound transmissions) or of transmissions originating from another source such as a UE 115 or a BS 105. The RF unit 1214 may be further configured to perform analog beamforming in conjunction with the digital beamforming. Although shown as integrated together in transceiver 1210, the modem subsystem 1212 and the RF unit 1214 may be separate devices that are coupled together at the UE 115 to enable the UE 115 to communicate with other devices.

The RF unit 1214 may provide the modulated and/or processed data, e.g. data packets (or, more generally, data messages that may contain one or more data packets and other information), to the antennas 1216 for transmission to one or more other devices. The antennas 1216 may further receive data messages transmitted from other devices. The antennas 1216 may provide the received data messages for processing and/or demodulation at the transceiver 1210. The transceiver 1210 may provide the demodulated and decoded data (e.g., RRC configurations and SPS configurations, activations, reactivations, and releases, PDSCH data, DCI) to the SFI module 1208 for processing. The antennas 1216 may include multiple antennas of similar or different designs in order to sustain multiple transmission links.

In an example, the transceiver 1210 is configured to communicate with one or more components of the UE 1200 to: receive, at a first time, the first downlink information including the first SFI, where the first SFI is associated with a first period; and receive, from the BS at a second time different form the first time, second downlink information including a second SFI and a second validation field for the second SFI, where the second SFI is associated with a second period at least partially overlapping with the first period. In another aspect, the transceiver 1210 is configured to receive a conflict resolution configuration. In another aspect, the transceiver 1210 is configured to receive, from the BS, a semi-persistent scheduling (SPS) configuration indicating a plurality of downlink (DL) SPS occasions.

In some aspects, the transceiver 1210 is configured to receive, at a first time, the first downlink information including the first SFI, where the first SFI is associated with a first period. In another aspect, the transceiver 1210 is configured to receive, from the BS at a second time different form the first time, second downlink information including a second SFI and a second validation field for the second SFI, where the second SFI is associated with a second period at least partially overlapping with the first period. In another aspect, the transceiver 1210 is configured to receive a conflict resolution configuration.

In an aspect, the UE 1200 can include multiple transceivers 1210 implementing different RATs (e.g., NR and LTE). In an aspect, the UE 1200 can include a single transceiver 1210 implementing multiple RATs (e.g., NR and LTE). In an aspect, the transceiver 1210 can include various components, where different combinations of components can implement different RATs.

Figure 13:
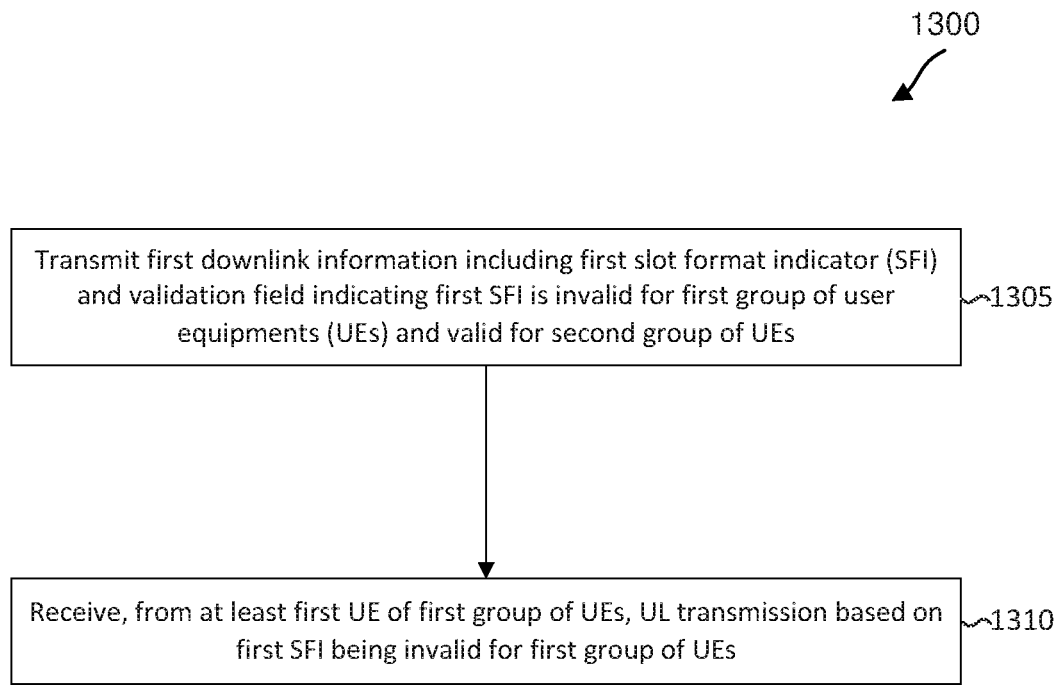
FIG. 13 is a flow diagram of a communication method according to some aspects of the present disclosure.

FIG. 13 is a flow diagram illustrating a communication method 1300 according to some aspects of the present disclosure. Aspects of the method 1300 can be executed by a computing device (e.g., a processor, processing circuit, and/or other suitable component) of a wireless communication device or other suitable means for performing the steps. For example, a wireless communication device, such as a BS 105 or the BS 1100, may utilize one or more components, such as the processor 1102, the memory 1104, the SFI module 1108, the transceiver 1110, the modem 1112, and the one or more antennas 1116, to execute the steps of method 1300. The method 1300 may employ similar mechanisms as described in FIGS. 6-10. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1305, the BS 105 transmits first downlink information including a first slot format indicator (SFI) and validation field indicating the first SFI is invalid for a first group of user equipments (UEs) and valid for a second group of UEs. In some aspects, the first group of UEs includes a high-priority group of UEs, and the second group of UEs includes a low-priority group of UEs. In some aspects, the transmitting the first downlink information includes transmitting, in a group common-physical downlink control channel (GC-PDCCH), the first downlink information including the first SFI and the validation field. In some aspects, the transmitting the first downlink information includes transmitting, at a first time, the first downlink information including the first SFI, where the first SFI is associated with a first period. In some aspects, the method 1300 further includes transmitting, at a second time different from the first time, second downlink information including a second SFI and a second validation field for the second SFI, where the second SFI is associated with a second period at least partially overlapping with the first period. In some aspects, the method 1300 further includes transmitting, to at least one of the first group of UEs or the second group of UEs, a conflict resolution configuration indicating an instruction to select the first SFI is both the first SFI and the second SFI are validated. In some aspects, the BS 105 may utilize one or more components, such as the processor 1102, the memory 1104, the SFI module 1108, the transceiver 1110, the modem 1112, and the one or more antennas 1116, to perform the operations at block 1305.

At block 1310, the BS 105 receives, from at least a first UE of a first group of UEs, a UL transmission based on the first SFI being invalid for the first group of UEs. In some aspects, the BS 105 may utilize one or more components, such as the processor 1102, the memory 1104, the SFI module 1108, the transceiver 1110, the modem 1112, and the one or more antennas 1116, to perform the operations at block 1310.

In some aspects, the method 1300 further includes transmitting, to the first UE, a semi-persistent scheduling (SPS) configuration indicating a plurality of downlink (DL) SPS occasions. In some aspects, the receiving the UL transmission includes receiving, from the first UE, an acknowledgement/negative-acknowledgment (ACK/NACK) for a DL communication signal in a first DL SPS occasion of the plurality of DL SPS occasions. In some aspects, the first SFI is associated with a time period, and the method 1300 further includes refraining from monitoring for an UL transmission from the second group of UEs during the time period based on the first SFI being valid for the second group of UEs. In another aspect, the method 1300 further includes: transmitting, to a second UE of the second group of UEs, a second SPS configuration indicating a second plurality of DL SPS occasions; cancelling a DL transmission in a first DL SPS occasion of the second plurality of DL SPS occasions; and determining, based at least in part on cancelling the DL transmission in the first DL SPS occasion of the second plurality of DL SPS occasions, the first SFI and that the first SFI is valid for the second group of UEs.

In some aspects, the method 1300 further includes generating the first downlink information based on a radio network temporary identifier (RNTI) associated with a SFI validation. In some aspects, the method 1300 further includes transmitting a first slot configuration indicating either an UL direction or a flexible symbol for at least a first symbol. In some aspects, the first SFI is associated with a second slot configuration, where the first SFI indicates a DL direction for at least the first symbol. In some aspects, the receiving the UL transmission includes receiving, from at least the first UE of the first group in one or more symbols including at least the first symbol, the UL transmission. In some aspects, the transmitting the first slot configuration includes transmitting, to the UE, a second SFI. In some aspects, the transmitting the first slot configuration includes transmitting, to the UE, a radio resource control (RRC) configuration, where the RRC configuration includes the first slot configuration, and where the first slot configuration indicates a flexile symbol for the at least the first symbol.

Figure 14:
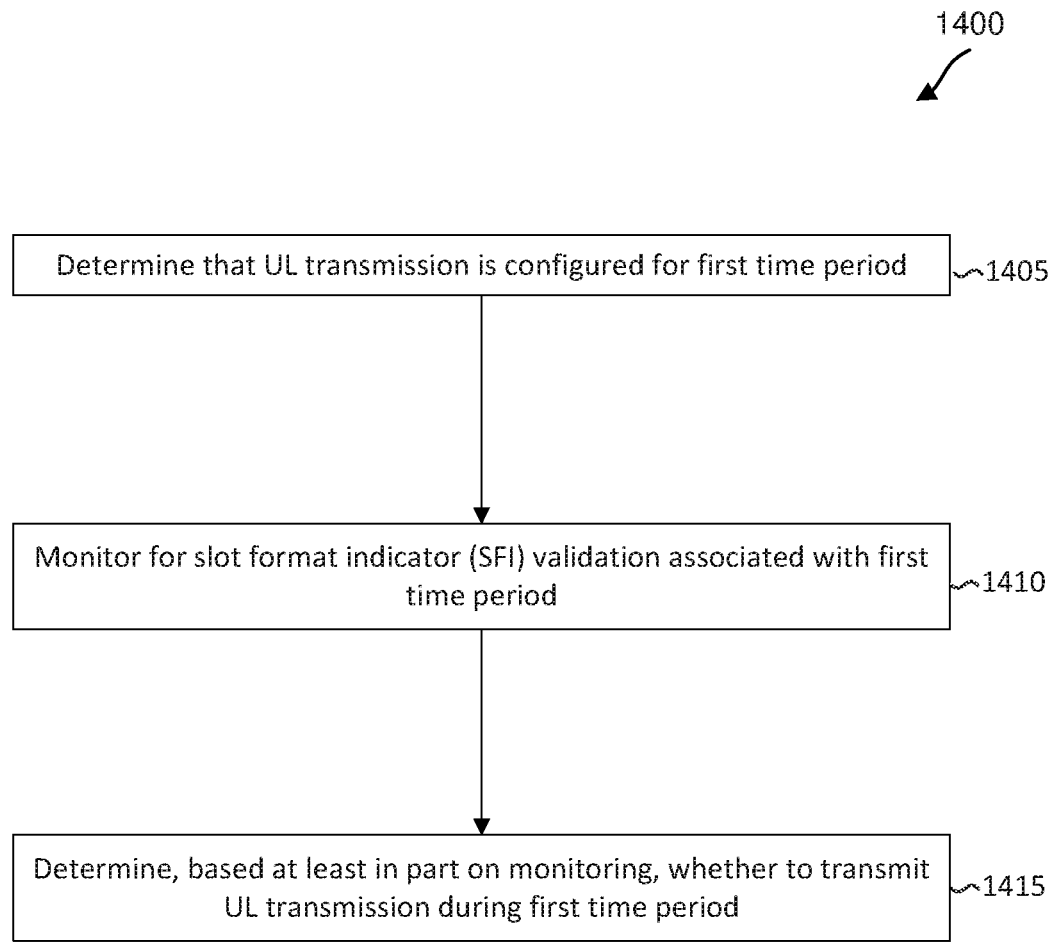
FIG. 14 is a flow diagram of a communication method according to some aspects of the present disclosure.

FIG. 14 is a flow diagram illustrating a communication method 1400 according to some aspects of the present disclosure. Aspects of the method 1400 can be executed by a computing device (e.g., a processor, processing circuit, and/or other suitable component) of a wireless communication device or other suitable means for performing the steps. For example, a wireless communication device, such as a UE 115 or the UE 1200, may utilize one or more components, such as the processor 1202, the memory 1204, the SFI module 1208, the transceiver 1210, the modem 1212, and the one or more antennas 1216, to execute the steps of method 1400. The method 1400 may employ similar mechanisms as described in FIGS. 1-6, 8, and 11. As illustrated, the method 1400 includes a number of enumerated steps, but aspects of the method 1400 may include additional steps before, after, and in between the enumerated steps. In some aspects, one or more of the enumerated steps may be omitted or performed in a different order.

At block 1405, the UE 115 determines that an uplink (UL) transmission is configured for a first time period. In some aspects, the UE 115 may utilize one or more components, such as the processor 1202, the memory 1204, the SFI module 1208, the transceiver 1210, the modem 1212, and the one or more antennas 1216, to perform the operations at block 1405.

At block 1410, the UE 115 monitors for a slot format indicator (SFI) validation associated with the first time period. In some aspects, the monitoring for the SFI includes receiving, from a BS, first downlink information including a first SFI and a validation field associated with the first SFI. In some aspects, the UE 115 may utilize one or more components, such as the processor 1202, the memory 1204, the SFI module 1208, the transceiver 1210, the modem 1212, and the one or more antennas 1216, to perform the operations at block 1410.

At block 1415, the UE 115 determines, based at least in part on the monitoring, whether to transmit the UL transmission during the first time period. In some aspects, the determining whether to transmit the UL transmission includes: determining, based on the validation field, whether the SFI is valid, and refraining, in response to determining that the first SFI is valid, from transmitting the UL transmission. In some aspects, the UE 115 may utilize one or more components, such as the processor 1202, the memory 1204, the SFI module 1208, the transceiver 1210, the modem 1212, and the one or more antennas 1216, to perform the operations at block 1415.

In some aspects, the method 1400 further includes receiving, from the BS, a semi-persistent scheduling (SPS) configuration indicating a plurality of downlink (DL) SPS occasions. In some aspects, the refraining from transmitting the UL transmission includes refraining from transmission an acknowledgement/negative-acknowledgement (ACK/NACK) for a first DL SPS occasion of the plurality of DL SPS occasions. In some aspects, the method 1400 further includes determining that the first SFI indicates a downlink direction for at least a first symbol, and the refraining from transmitting the UL transmission includes refraining from transmitting the UL transmission in one or more symbols including the first symbol in response to determining that the first SFI indicates the downlink direction for at least the first symbol. In some aspects, the first SFI is associated with a group of UEs, and the validation field includes a first validation portion associated with a subgroup of the group of UEs. In some aspects, the validation field includes a bitmap, and each bit of the bitmap is associated with a different group of subgroup of the UEs. For example, in some aspects, a first bit of the validation field is associated with a high-priority subgroup of UEs, and a second bit of the validation field is associated with a low-priority subgroup of UEs. In some aspects, the method 1400 further includes decoding the first downlink information based on a radio network temporary identifier (RNTI) associated with the SFI validation.

In some aspects, receiving the first downlink information includes receiving, at a first time, the first downlink information including the first SFI, where the first SFI is associated with a first period. In another aspect, the method 1400 further includes: receiving, from the BS at a second time different form the first time, second downlink information including a second SFI and a second validation field for the second SFI, where the second SFI is associated with a second period at least partially overlapping with the first period; and determining, based on the second validation field, whether the second SFI is valid. In another aspect, the refraining from transmitting the UL transmission includes: refraining, in response to determining that the second SFI is valid, from transmitting the UL transmission during an overlapping period between the first period and the second period. In another aspect, the method 1400 further includes selecting, in response to determining that the first SFI and the second SFI are valid, the first SFI. In another aspect, the method 1400 further includes: receiving a conflict resolution configuration. In another aspect, the selecting the first SFI includes selecting the first SFI based on the conflict resolution configuration.

In another aspect, the method 1400 further includes determining, based on the monitoring, that the SFI validation has not occurred. In some aspects, the determining whether to transmit the UL transmission includes determining to transmit the UL transmission based on a default slot configuration in response to determining that the SFI validation has not occurred. In some aspects, the method 1400 further includes: determining, based on the monitoring, that the SI validation has not occurred; and refraining, based on determining that the SFI validation has not occurred, from transmitting the UL transmission.

Further aspects of the present disclosure include the following:
1. A method of wireless communication performed by a user equipment (UE), the method comprising:
    determining that an uplink (UL) transmission is configured for a first time period;
    monitoring for a slot format indicator (SFI) validation associated with the first time period; and
    determining, based at least in part on the monitoring, whether to transmit the UL transmission during the first time period.
2. The method of clause 1, wherein:
    the monitoring comprises:
        receiving, from a base station (BS), first downlink information including a first slot format indicator (SFI) and a validation field associated with the first SFI; and the determining comprises:
        determining, based on the validation field, whether the first SFI is valid; and
        refraining, in response to determining that the first SFI is valid, from transmitting the UL transmission.
3. The method of clause 2, further comprising:
    receiving, from the BS, a semi-persistent scheduling (SPS) configuration indicating a plurality of downlink (DL) SPS occasions,
    wherein the refraining from transmitting the UL transmission comprises:
        refraining from transmitting an acknowledgement/ negative-acknowledgement (ACK/NACK) for a first DL SPS occasion of the plurality of DL SPS occasions.
4. The method of clauses 2-3, further comprising:
    determining that the first SFI indicates a downlink direction for at least a first symbol,
    wherein the refraining from transmitting the UL transmission comprises:
        refraining from transmitting the UL transmission in one or more symbols including the first symbol in response to determining that the first SFI indicates the downlink direction for at least the first symbol.
5. The method of clauses 2-4, wherein the first SFI is associated with a group of UEs, and wherein the validation field includes a first validation portion associated with a subgroup of the group of UEs.
6. The method of clause 5, wherein the validation field comprises a bitmap, and wherein each bit of the bitmap is associated with a different subgroup of the group of UEs.
7. The method of clauses 5-6, wherein a first bit of the validation field is associated with a high-priority subgroup of UEs, and wherein a second bit of the validation field is associated with a low-priority subgroup of UEs.
8. The method of clauses 2-7, wherein the receiving the first downlink information comprises:
    receiving, in a group common-physical downlink control channel (GC-PDCCH), the first downlink information including the first SFI and the validation field.
9. The method of clause 8, further comprising:
    decoding the first downlink information based on a radio network temporary identifier (RNTI) associated with a SFI validation.
10. The method of clauses 2-4 and 8-9,
    wherein the receiving the first downlink information includes receiving, at a first time, the first downlink information including the first SFI, wherein the first SFI is associated with a first period, and
    wherein the method further includes:
        receiving, from the BS at a second time different from the first time, second downlink information including a second SFI and a second validation field for the second SFI, wherein the second SFI is associated with a second period at least partially overlapping with the first period; and determining, based on the second validation field, whether the second SFI is valid.

11. The method of clause 10, wherein the refraining from transmitting the UL transmission comprises:

refraining, in response to determining that the second SFI is valid, from transmitting the UL transmission during an overlapping period between the first period and the second period.

12. The method of clause 10, further comprising:

selecting, in response to determining that the first SFI and the second SFI are valid, the first SFI.

13. The method of clause 12, further comprising:

receiving a conflict resolution configuration, wherein the selecting the first SFI comprises selecting the first SFI based on the conflict resolution configuration.

14. The method of clause 1, further comprising:

determining, based on the monitoring, that the SFI validation has not occurred, wherein the determining whether to transmit the UL transmission comprises determining to transmit the UL transmission based on a default slot configuration in response to determining that the SFI validation has not occurred.

15. The method of clause 1, further comprising:

determining, based on the monitoring, that the SFI validation has not occurred; and refraining, based on determining that the SFI validation has not occurred, from transmitting the UL transmission.

16. A method of wireless communication performed by a base station (BS), the method comprising:

transmitting first downlink information including a first slot format indicator (SFI) and a validation field indicating the first SFI is invalid for a first group of user equipments (UEs) and valid for a second group of UEs; and receiving, from at least a first UE of the first group of UEs, an UL transmission based on the first SFI being invalid for the first group of UEs.

17. The method of clause 16, further comprising:

transmitting, to the first UE, a semi-persistent scheduling (SPS) configuration indicating a plurality of downlink (DL) SPS occasions, wherein the receiving the UL transmission comprises:

receiving, from the first UE, an acknowledgement/negative-acknowledgement (ACK/NACK) for a DL communication signal in a first DL SPS occasion of the plurality of DL SPS occasions.

18. The method of clauses 16-17, wherein the first SFI is associated with a time period, the method further comprising:

refraining from monitoring for an UL transmission from the second group of UEs during the time period based on the first SFI being valid for the second group of UEs.

19. The method of clause 18, further comprising:

transmitting, to a second UE of the second group of UEs, a second semi-persistent scheduling (SPS) configuration indicating a second plurality of downlink (DL) SPS occasions;

cancelling a DL transmission in a first DL SPS occasion of the second plurality of DL SPS occasions; and determining, based at least in part on cancelling the DL transmission in the first DL SPS occasion of the second plurality of DL SPS occasions, the first SFI and that the first SFI is valid for the second group of UEs.

20. The method of clauses 16-19, wherein the first group of UEs includes a high-priority group of UEs, and wherein the second group of UEs includes a low-priority group of UEs.

21. The method of clauses 16-20, wherein the transmitting the first downlink information comprises:

transmitting, in a group common-physical downlink control channel (GC-PDCCH), the first downlink information including the first SFI and the validation field.

22. The method of clause 21, further comprising:

generating the first downlink information based on a radio network temporary identifier (RNTI) associated with a SFI validation.

23. The method of clauses 16-22, wherein the transmitting the first downlink information includes transmitting, at a first time, the first downlink information including the first SFI, wherein the first SFI is associated with a first period, and wherein the method further includes:

transmitting, at a second time different from the first time, second downlink information including a second SFI and a second validation field for the second SFI, wherein the second SFI is associated with a second period at least partially overlapping with the first period.

24. The method of clause 23, further comprising:

transmitting, to at least one of the first group of UEs or the second group of UEs, a conflict resolution configuration indicating an instruction to select the first SFI if both the first SFI and the second SFI are validated.

25. The method of clauses 16-24, further comprising:

transmitting a first slot configuration indicating either an UL direction or a flexible symbol for at least a first symbol;

wherein the first SFI is associated with a second slot configuration, wherein the first SFI indicates a DL direction for at least the first symbol, wherein the receiving the UL transmission comprises:

receiving, from at least the first UE of the first group in one more symbols including at least the first symbol, the UL transmission.

26. The method of clause 25, wherein the transmitting the first slot configuration comprises:

transmitting, to the UE, a second SFI.

27. The method of clauses 25, wherein the transmitting the first slot configuration comprises:

transmitting, to the UE, a radio resource control (RRC) configuration, wherein the RRC configuration comprises the first slot configuration, and wherein the first slot configuration indicates a flexible symbol for the at least the first symbol.

28. A user equipment (UE), comprising:

a processor configured to:

determine that an uplink (UL) transmission is configured for a first time period;

monitor for a slot format indicator (SFI) validation associated with the first time period; and determine, based at least in part on the monitoring, whether to transmit the UL transmission during the first time period.

29. The UE of clause 28, further comprising:

a transceiver, wherein:

the processor configured to monitor for the SFI comprises:
the processor configured to cause the transceiver to:
receive, from a base station (BS), first downlink information including a first SFI and a validation field associated with the first SFI, and
wherein the processor configured to determine whether to transmit the UL transmission comprises the processor configured to:
determine, based on the validation field, whether the first SFI is valid; and
refrain, in response to determining that the first SFI is valid, from transmitting the UL transmission.

30. The UE of clause 29, wherein the transceiver is configured to:
receive, from the BS, a semi-persistent scheduling (SPS) configuration indicating a plurality of downlink (DL) SPS occasions, and
wherein the processor configured to refrain from transmitting the UL transmission comprises the processor configured to:
refrain from transmitting an acknowledgement/negative-acknowledgement (ACK/NACK) for a first DL SPS occasion of the plurality of DL SPS occasions.

31. The UE of clauses 29-30, wherein the processor is further configured to:
determine that the first SFI indicates a downlink direction for at least a first symbol,
wherein the processor configured to refrain from transmitting the UL transmission comprises the processor configured to:
refrain from transmitting the UL transmission in one or more symbols including the first symbol in response to determining that the first SFI indicates the downlink direction for at least the first symbol.

32. The UE of clauses 29-31, wherein the first SFI is associated with a group of UEs, and wherein the validation field includes a first validation portion associated with a subgroup of the group of UEs.

33. The UE of clause 32, wherein the validation field comprises a bitmap, and wherein each bit of the bitmap is associated with a different subgroup of the group of UEs.

34. The UE of clauses 32-33 wherein a first bit of the validation field is associated with a high-priority subgroup of UEs, and wherein a second bit of the validation field is associated with a low-priority subgroup of UEs.

35. The UE of clauses 29-34, wherein the processor configured to cause the transceiver to receive the first downlink information comprises the transceiver configured to:
receive, in a group common-physical downlink control channel (GC-PDCCH), the first downlink information including the first SFI and the validation field.

36. The UE of clause 35, wherein the processor is further configured to:
decode the first downlink information based on a radio network temporary identifier (RNTI) associated with the SFI validation.

37. The UE of clause 29-31 and 35-36,
wherein the processor configured to cause the transceiver to receive the first downlink information comprises:
the transceiver configured to:
receive, at a first time, the first downlink information including the first SFI, wherein the first SFI is associated with a first period, and
wherein the transceiver is further configured to:
receive, from the BS at a second time different from the first time, second downlink information including a second SFI and a second validation field for the second SFI, wherein the second SFI is associated with a second period at least partially overlapping with the first period, and
wherein the processor is further configured to:
determine, based on the second validation field, whether the second SFI is valid.

38. The UE of clause 37, wherein the processor configured to refrain from transmitting the UL transmission comprises the processor configured to:
refrain, in response to determining that the second SFI is valid, from transmitting the UL transmission during an overlapping period between the first period and the second period.

39. The UE of clause 37, wherein the processor is further configured to:
select, in response to determining that the first SFI and the second SFI are valid, the first SFI.

40. The UE of clause 39, wherein the transceiver is further configured to:
receive a conflict resolution configuration,
wherein the processor configured to select the first SFI comprises the processor configured to:
select the first SFI based on the conflict resolution configuration.

41. The UE of clause 28, wherein the processor is further configured to:
determine, based on the monitoring, that the SFI validation has not occurred,
wherein the processor configured to determine whether to transmit the UL transmission comprises the processor configured to:
determine to transmit the UL transmission based on a default slot configuration in response to determining that the SFI validation has not occurred.

42. The UE of clause 28, wherein the processor is further configured to:
determine, based on the monitoring, that the SFI validation has not occurred; and
refrain, based on determining that the SFI validation has not occurred, from transmitting the UL transmission.

43. A base station (BS), the comprising:
a transceiver configured to:
transmit first downlink information including a first slot format indicator (SFI) and a validation field indicating the first SFI is invalid for a first group of user equipments (UEs) and valid for a second group of UEs; and
receive, from at least a first UE of the first group of UEs, an UL transmission based on the first SFI being invalid for the first group of UEs.

44. The BS of clause 43, wherein the transceiver is further configured to:
transmit, to the first UE, a semi-persistent scheduling (SPS) configuration indicating a plurality of downlink (DL) SPS occasions,
wherein the transceiver configured to receive the UL transmission comprises the transceiver configured to:

receive, from the first UE, an acknowledgement/negative-acknowledgement (ACK/NACK) for a DL communication signal in a first DL SPS occasion of the plurality of DL SPS occasions.

45. The BS of clauses 43-44, wherein the first SFI is associated with a time period, and wherein the BS further comprises a processor configured to:
refrain from monitoring for an UL transmission from the second group of UEs during the time period based on the first SFI being valid for the second group of UEs.

46. The BS of clause 45, wherein the transceiver is further configured to:
transmit, to a second UE of the second group of UEs, a second SPS configuration indicating a second plurality of DL SPS occasions, and
wherein the processor is further configured to:
cancel a DL transmission in a first DL SPS occasion of the second plurality of DL SPS occasions; and
determine, based at least in part on cancelling the DL transmission in the first DL SPS occasion of the second plurality of DL SPS occasions:
the first SFI; and
that the first SFI is valid for the second group of UEs.

47. The BS of clauses 43-46, wherein the first group of UEs includes a high-priority group of UEs, and wherein the second group of UEs includes a low-priority group of UEs.

48. The BS of clauses 43-47, wherein the transceiver configured to transmit the first downlink information comprises the transceiver configured to:
transmit, in a group common-physical downlink control channel (GC-PDCCH), the first downlink information including the first SFI and the validation field.

49. The BS of clause 48, wherein the processor is further configured to:
generate the first downlink information based on a radio network temporary identifier (RNTI) associated with a SFI validation.

50. The BS of clause 43-49,
wherein the transceiver configured to transmit the first downlink information includes the transceiver configured to transmit, at a first time, the first downlink information including the first SFI, wherein the first SFI is associated with a first period, and
wherein the transceiver is further configured to:
transmit, at a second time different from the first time, second downlink information including a second SFI and a second validation field for the second SFI, wherein the second SFI is associated with a second period at least partially overlapping with the first period.

51. The BS of clause 50, wherein the transceiver is further configured to:
transmit, to at least one of the first group of UEs or the second group of UEs, a conflict resolution configuration indicating an instruction to select the first SFI if both the first SFI and the second SFI are validated.

52. The BS of clauses 43-51, wherein the transceiver is further configured to:
transmit a first slot configuration indicating either an UL direction or a flexible symbol for at least a first symbol;
wherein the first SFI is associated with a second slot configuration, wherein the first SFI indicates a DL direction for at least the first symbol, and
wherein the transceiver configured to receive the UL transmission comprises the transceiver configured to:
receive, from at least the first UE of the first group in one more symbols including at least the first symbol, the UL transmission.

53. The BS of clause 52, wherein the transceiver configured to transmit the first slot configuration comprises the transceiver configured to:
transmit, to the UE, a second SFI.

54. The BS of clause 52, wherein the transceiver configured to transmit the first slot configuration comprises the transceiver configured to:
transmit, to the UE, a radio resource control (RRC) configuration, wherein the RRC configuration comprises the first slot configuration, and wherein the first slot configuration indicates a flexible symbol for the at least the first symbol.

Further aspects of the disclosure include the following:

1. A method of wireless communication performed by a base station (BS), the method comprising:
transmitting first downlink information including a first slot format indicator (SFI) and a validation field indicating the first SFI is invalid for a first group of user equipments (UEs) and valid for a second group of UEs; and
receiving, from at least a first UE of the first group of UEs, an UL transmission based on the first SFI being invalid for the first group of UEs.

2. The method of clause 1, further comprising:
transmitting, to the first UE, a semi-persistent scheduling (SPS) configuration indicating a plurality of downlink (DL) SPS occasions,
wherein the receiving the UL transmission comprises:
receiving, from the first UE, an acknowledgement/negative-acknowledgement (ACK/NACK) for a DL communication signal in a first DL SPS occasion of the plurality of DL SPS occasions.

3. The method of clause 1, wherein the first SFI is associated with a time period, the method further comprising:
refraining from monitoring for an UL transmission from the second group of UEs during the time period based on the first SFI being valid for the second group of UEs.

4. The method of clause 3, further comprising:
transmitting, to a second UE of the second group of UEs, a second SPS configuration indicating a second plurality of DL SPS occasions;
cancelling a DL transmission in a first DL SPS occasion of the second plurality of DL SPS occasions; and
determining, based at least in part on cancelling the DL transmission in the first DL SPS occasion of the second plurality of DL SPS occasions:
the first SFI; and
that the first SFI is valid for the second group of UEs.

5. The method of clause 1, wherein the first group of UEs includes a high-priority group of UEs, and wherein the second group of UEs includes a low-priority group of UEs.

6. The method of clause 1, wherein the transmitting the first downlink information comprises:

transmitting, in a group common-physical downlink control channel (GC PDCCH), the first downlink information including the first SFI and the validation field.

7. The method of clause 6, further comprising:
generating the first downlink information based on a radio network temporary identifier (RNTI) associated with a SFI validation.

8. The method of clause 1,
wherein the transmitting the first downlink information includes transmitting, at a first time, the first downlink information including the first SFI, wherein the first SFI is associated with a first period, and
wherein the method further includes:
transmitting, at a second time different from the first time, second downlink information including a second SFI and a second validation field for the second SFI, wherein the second SFI is associated with a second period at least partially overlapping with the first period.

9. The method of clause 8, further comprising:
transmitting, to at least one of the first group of UEs or the second group of UEs, a conflict resolution configuration indicating an instruction to select the first SFI if both the first SFI and the second SFI are validated.

10. The method of clause 1, further comprising:
transmitting a first slot configuration indicating either an UL direction or a flexible symbol for at least a first symbol;
wherein the first SFI is associated with a second slot configuration, wherein the first SFI indicates a DL direction for at least the first symbol, and
wherein the receiving the UL transmission comprises:
receiving, from at least the first UE of the first group in one more symbols including at least the first symbol, the UL transmission.

11. The method of clause 10, wherein the transmitting the first slot configuration comprises:
transmitting, to the UE, a second SFI.

12. The method of clause 10, wherein the transmitting the first slot configuration comprises:
transmitting, to the UE, a radio resource control (RRC) configuration, wherein the RRC configuration comprises the first slot configuration, and wherein the first slot configuration indicates a flexible symbol for the at least the first symbol.

13. A user equipment (UE), comprising:
a processor configured to:
determine that an uplink (UL) transmission is configured for a first time period;
monitor for a slot format indicator (SFI) validation associated with the first time period; and
determine, based at least in part on the monitoring, whether to transmit the UL transmission during the first time period.

14. The UE of clause 13, further comprising:
a transceiver, wherein:
the processor configured to monitor for the SFI comprises:
the processor configured to cause the transceiver to:
receive, from a base station (BS), first downlink information including a first SFI and a validation field associated with the first SFI, and
wherein the processor configured to determine whether to transmit the UL transmission comprises the processor configured to:
determine, based on the validation field, whether the first SFI is valid; and
refrain, in response to determining that the first SFI is valid, from transmitting the UL transmission.

15. The UE of clause 14, wherein the transceiver is configured to:
receive, from the BS, a semi-persistent scheduling (SPS) configuration indicating a plurality of downlink (DL) SPS occasions, and
wherein the processor configured to refrain from transmitting the UL transmission comprises the processor configured to:
refrain from transmitting an acknowledgement/negative-acknowledgement (ACK/NACK) for a first DL SPS occasion of the plurality of DL SPS occasions.

16. The UE of clause 14, wherein the processor is further configured to:
determine that the first SFI indicates a downlink direction for at least a first symbol,
wherein the processor configured to refrain from transmitting the UL transmission comprises the processor configured to:
refrain from transmitting the UL transmission in one or more symbols including the first symbol in response to determining that the first SFI indicates the downlink direction for at least the first symbol.

17. The UE of clause 14, wherein the first SFI is associated with a group of UEs, and wherein the validation field includes a first validation portion associated with a subgroup of the group of UEs.

18. The UE of clause 17, wherein the validation field comprises a bitmap, and wherein each bit of the bitmap is associated with a different subgroup of the group of UEs.

19. The UE of clause 17, wherein a first bit of the validation field is associated with a high-priority subgroup of UEs, and wherein a second bit of the validation field is associated with a low-priority subgroup of UEs.

20. The UE of clause 14, wherein the processor configured to cause the transceiver to receive the first downlink information comprises the transceiver configured to:
receive, in a group common-physical downlink control channel (GC PDCCH), the first downlink information including the first SFI and the validation field.

21. The UE of clause 20, wherein the processor is further configured to:
decode the first downlink information based on a radio network temporary identifier (RNTI) associated with the SFI validation.

22. The UE of clause 14,
wherein the processor configured to cause the transceiver to receive the first downlink information comprises:
the transceiver configured to:
receive, at a first time, the first downlink information including the first SFI,
wherein the first SFI is associated with a first period, and wherein the transceiver is further configured to:
receive, from the BS at a second time different from the first time, second downlink information including a second SFI and a second validation field for the second SFI, wherein the second SFI is associated with a second period at least partially overlapping with the first period, and wherein the processor is further configured to:
determine, based on the second validation field, whether the second SFI is valid.

23. The UE of clause 22, wherein the processor configured to refrain from transmitting the UL transmission comprises the processor configured to:
refrain, in response to determining that the second SFI is valid, from transmitting the UL transmission during an overlapping period between the first period and the second period.

24. The UE of clause 22, wherein the processor is further configured to:
select, in response to determining that the first SFI and the second SFI are valid, the first SFI.

25. The UE of clause 24, wherein the transceiver is further configured to:
receive a conflict resolution configuration,
wherein the processor configured to select the first SFI comprises the processor configured to:
select the first SFI based on the conflict resolution configuration.

26. The UE of clause 13, wherein the processor is further configured to:
determine, based on the monitoring, that the SFI validation has not occurred,
wherein the processor configured to determine whether to transmit the UL transmission comprises the processor configured to:
determine to transmit the UL transmission based on a default slot configuration in response to determining that the SFI validation has not occurred.

27. The UE of clause 13, wherein the processor is further configured to:
determine, based on the monitoring, that the SFI validation has not occurred; and
refrain, based on determining that the SFI validation has not occurred, from transmitting the UL transmission.

28. A base station (BS), the comprising:
a transceiver configured to:
transmit first downlink information including a first slot format indicator (SFI) and a validation field indicating the first SFI is invalid for a first group of user equipments (UEs) and valid for a second group of UEs; and
receive, from at least a first UE of the first group of UEs, an UL transmission based on the first SFI being invalid for the first group of UEs.

29. The BS of clause 28, wherein the transceiver is further configured to:
transmit, to the first UE, a semi-persistent scheduling (SPS) configuration indicating a plurality of downlink (DL) SPS occasions,
wherein the transceiver configured to receive the UL transmission comprises the transceiver configured to:
receive, from the first UE, an acknowledgement/negative-acknowledgement (ACK/NACK) for a DL communication signal in a first DL SPS occasion of the plurality of DL SPS occasions.

30. The BS of clause 28, wherein the first SFI is associated with a time period, and wherein the BS further comprises a processor configured to:
refrain from monitoring for an UL transmission from the second group of UEs during the time period based on the first SFI being valid for the second group of UEs.

31. The BS of clause 30, wherein the transceiver is further configured to:
transmit, to a second UE of the second group of UEs, a second SPS configuration indicating a second plurality of DL SPS occasions, and
wherein the processor is further configured to:
cancel a DL transmission in a first DL SPS occasion of the second plurality of DL SPS occasions; and
determine, based at least in part on cancelling the DL transmission in the first DL SPS occasion of the second plurality of DL SPS occasions:
the first SFI; and
that the first SFI is valid for the second group of UEs.

32. The BS of clause 28, wherein the first group of UEs includes a high-priority group of UEs, and wherein the second group of UEs includes a low-priority group of UEs.

33. The BS of clause 28, wherein the transceiver configured to transmit the first downlink information comprises the transceiver configured to:
transmit, in a group common-physical downlink control channel (GC PDCCH), the first downlink information including the first SFI and the validation field.

34. The BS of clause 33, wherein the processor is further configured to:
generate the first downlink information based on a radio network temporary identifier (RNTI) associated with a SFI validation.

35. The BS of clause 28,
wherein the transceiver configured to transmit the first downlink information includes the transceiver configured to transmit, at a first time, the first downlink information including the first SFI, wherein the first SFI is associated with a first period, and
wherein the transceiver is further configured to:
transmit, at a second time different from the first time, second downlink information including a second SFI and a second validation field for the second SFI, wherein the second SFI is associated with a second period at least partially overlapping with the first period.

36. The BS of clause 35, wherein the transceiver is further configured to:
transmit, to at least one of the first group of UEs or the second group of UEs, a conflict resolution configuration indicating an instruction to select the first SFI if both the first SFI and the second SFI are validated.

37. The BS of clause 28, wherein the transceiver is further configured to:
transmit a first slot configuration indicating either an UL direction or a flexible symbol for at least a first symbol;
wherein the first SFI is associated with a second slot configuration, wherein the first SFI indicates a DL direction for at least the first symbol, and
wherein the transceiver configured to receive the UL transmission comprises the transceiver configured to:
receive, from at least the first UE of the first group in one more symbols including at least the first symbol, the UL transmission.

38. The BS of clause 37, wherein the transceiver configured to transmit the first slot configuration comprises the transceiver configured to:
   transmit, to the UE, a second SFI.
39. The BS of clause 37, wherein the transceiver configured to transmit the first slot configuration comprises the transceiver configured to:
   transmit, to the UE, a radio resource control (RRC) configuration, wherein the RRC configuration comprises the first slot configuration, and wherein the first slot configuration indicates a flexible symbol for the at least the first symbol.
40. A non-transitory, computer-readable medium having program code recorded thereon, the program code comprising:
   code for causing a user equipment (UE) to determine that an uplink (UL) transmission is configured for a first time period;
   code for causing the UE to monitor for a slot format indicator (SFI) validation associated with the first time period; and
   code for causing the UE to determine, based at least in part on the monitoring, whether to transmit the UL transmission during the first time period.
41. The non-transitory, computer-readable medium of clause 40, wherein:
   the code for causing the UE to monitor for the SFI comprises:
      code for causing the UE to receive, from a base station (BS), first downlink information including a first SFI and a validation field associated with the first SFI, and the code for causing the UE to determine whether to transmit the UL transmission comprises:
      code for causing the UE to determine, based on the validation field, whether the first SFI is valid; and
      code for causing the UE to refrain, in response to determining that the first SFI is valid, from transmitting the UL transmission.
42. The non-transitory, computer-readable medium of clause 41, wherein the program code further comprises:
   code for causing the UE to receive, from the BS, a semi-persistent scheduling (SPS) configuration indicating a plurality of downlink (DL) SPS occasions, and
   wherein the code for causing the UE to refrain from transmitting the UL transmission comprises:
      code for causing the UE to refrain from transmitting an acknowledgement/negative-acknowledgement (ACK/NACK) for a first DL SPS occasion of the plurality of DL SPS occasions.
43. The non-transitory, computer-readable medium of clause 41, wherein the program code further comprises:
   code for causing the UE to determine that the first SFI indicates a downlink direction for at least a first symbol,
   wherein the code for causing the UE to refrain from transmitting the UL transmission comprises:
      code for causing the UE to refrain from transmitting the UL transmission in one or more symbols including the first symbol in response to determining that the first SFI indicates the downlink direction for at least the first symbol.
44. The non-transitory, computer-readable medium of clause 41, wherein the first SFI is associated with a group of UEs, and wherein the validation field includes a first validation portion associated with a subgroup of the group of UEs.
45. The non-transitory, computer-readable medium of clause 44, wherein the validation field comprises a bitmap, and wherein each bit of the bitmap is associated with a different subgroup of the group of UEs.
46. The non-transitory, computer-readable medium of clause 44, wherein a first bit of the validation field is associated with a high-priority subgroup of UEs, and wherein a second bit of the validation field is associated with a low-priority subgroup of UEs.
47. The non-transitory, computer-readable medium of clause 41, wherein the code for causing the UE to receive the first downlink information comprises:
   code for causing the UE to receive, in a group common-physical downlink control channel (GC PDCCH), the first downlink information including the first SFI and the validation field.
48. The non-transitory, computer-readable medium of clause 47, wherein the program code further comprises:
   code for causing the UE to decode the first downlink information based on a radio network temporary identifier (RNTI) associated with the SFI validation.
49. The non-transitory, computer-readable medium of clause 41,
   wherein the code for causing the UE to receive the first downlink information comprises:
      code for causing the UE to receive, at a first time, the first downlink information including the first SFI, wherein the first SFI is associated with a first period, and wherein the program code further comprises:
      code for causing the UE to receive, from the BS at a second time different from the first time, second downlink information including a second SFI and a second validation field for the second SFI, wherein the second SFI is associated with a second period at least partially overlapping with the first period; and
      code for causing the UE to determine, based on the second validation field, whether the second SFI is valid.
50. The non-transitory, computer-readable medium of clause 49, wherein the code for causing the UE to refrain from transmitting the UL transmission comprises:
   code for causing the UE to refrain, in response to determining that the second SFI is valid, from transmitting the UL transmission during an overlapping period between the first period and the second period.
51. The non-transitory, computer-readable medium of clause 49, wherein the program code further comprises:
   code for causing the UE to select, in response to determining that the first SFI and the second SFI are valid, the first SFI.
52. The non-transitory, computer-readable medium of clause 51, wherein the program code further comprises:
   code for causing the UE to receive a conflict resolution configuration, wherein the code for causing the UE to select the first SFI comprises:
   code for causing the UE to select the first SFI based on the conflict resolution configuration.
53. The non-transitory, computer-readable medium of clause 40,
   wherein the program code further comprises:

code for causing the UE to determine, based on the monitoring, that the SFI validation has not occurred, and
wherein the code for causing the UE to determine whether to transmit the UL transmission comprises:
code for causing the UE to determine to transmit the UL transmission based on a default slot configuration in response to determining that the SFI validation has not occurred.

54. The non-transitory, computer-readable medium of clause 40, wherein the program code further comprises:
code for causing the UE to determine, based on the monitoring, that the SFI validation has not occurred; and
code for causing the UE to refrain, based on determining that the SFI validation has not occurred, from transmitting the UL transmission.

55. A non-transitory, computer-readable medium having program code recorded thereon, the program code comprising:
code for causing a base station (BS) to transmit first downlink information including a first slot format indicator (SFI) and a validation field indicating the first SFI is invalid for a first group of user equipments (UEs) and valid for a second group of UEs; and
code for causing the BS to receive, from at least a first UE of the first group of UEs, an UL transmission based on the first SFI being invalid for the first group of UEs.

56. The non-transitory, computer-readable medium of clause 55, wherein the program code further comprises:
transmit, to the first UE, a semi-persistent scheduling (SPS) configuration indicating a plurality of downlink (DL) SPS occasions,
wherein the code for causing the UE to receive the UL transmission comprises the transceiver configured to:
receive, from the first UE, an acknowledgement/negative-acknowledgement (ACK/NACK) for a DL communication signal in a first DL SPS occasion of the plurality of DL SPS occasions.

57. The non-transitory, computer-readable medium of clause 55, wherein the first SFI is associated with a time period, and wherein the program code further comprises:
code for causing the BS to refrain from monitoring for an UL transmission from the second group of UEs during the time period based on the first SFI being valid for the second group of UEs.

58. The non-transitory, computer-readable medium of clause 57, wherein the program code further comprises:
code for causing the BS to transmit, to a second UE of the second group of UEs, a second SPS configuration indicating a second plurality of DL SPS occasions;
code for causing the BS to cancel a DL transmission in a first DL SPS occasion of the second plurality of DL SPS occasions; and
code for causing the BS to determine, based at least in part on cancelling the DL transmission in the first DL SPS occasion of the second plurality of DL SPS occasions:
the first SFI; and
that the first SFI is valid for the second group of UEs.

59. The non-transitory, computer-readable medium of clause 55, wherein the first group of UEs includes a high-priority group of UEs, and wherein the second group of UEs includes a low-priority group of UEs.

60. The non-transitory, computer-readable medium of clause 55, wherein the code for causing the UE to transmit the first downlink information comprises:
code for causing the BS to transmit, in a group common-physical downlink control channel (GC PDCCH), the first downlink information including the first SFI and the validation field.

61. The non-transitory, computer-readable medium of clause 60, wherein the program code further comprises:
code for causing the BS to generate the first downlink information based on a radio network temporary identifier (RNTI) associated with a SFI validation.

62. The non-transitory, computer-readable medium of clause 55,
wherein the code for causing the UE to transmit the first downlink information comprises:
code for causing the BS to transmit, at a first time, the first downlink information including the first SFI, wherein the first SFI is associated with a first period; and
code for causing the BS to transmit, at a second time different from the first time, second downlink information including a second SFI and a second validation field for the second SFI, wherein the second SFI is associated with a second period at least partially overlapping with the first period.

63. The non-transitory, computer-readable medium of clause 62, wherein the program code further comprises:
code for causing the BS to transmit, to at least one of the first group of UEs or the second group of UEs, a conflict resolution configuration indicating an instruction to select the first SFI if both the first SFI and the second SFI are validated.

64. The non-transitory, computer-readable medium of clause 55, wherein the program code further comprises:
code for causing the BS to transmit a first slot configuration indicating either an UL direction or a flexible symbol for at least a first symbol;
wherein the first SFI is associated with a second slot configuration, wherein the first SFI indicates a DL direction for at least the first symbol, and
wherein the code for causing the UE to receive the UL transmission comprises:
code for causing the BS to receive, from at least the first UE of the first group in one more symbols including at least the first symbol, the UL transmission.

65. The non-transitory, computer-readable medium of clause 64, wherein the code for causing the UE to transmit the first slot configuration comprises:
code for causing the BS to transmit, to the UE, a second SFI.

66. The non-transitory, computer-readable medium of clause 64, wherein the code for causing the UE to transmit the first slot configuration comprises:
code for causing the BS to transmit, to the UE, a radio resource control (RRC) configuration, wherein the RRC configuration comprises the first slot configuration, and wherein the first slot configuration indicates a flexible symbol for the at least the first symbol.

67. A user equipment (UE), comprising:
means for determining that an uplink (UL) transmission is configured for a first time period;
means for monitoring for a slot format indicator (SFI) validation associated with the first time period; and means for determining, based at least in part on the monitoring, whether to transmit the UL transmission during the first time period.
68. The UE of clause 67, wherein:
the means for monitoring for the SFI comprises:
means for receiving, from a base station (BS), first downlink information including a first SFI and a validation field associated with the first SFI; and
the means for determining whether to transmit the UL transmission comprises:
means for determining, based on the validation field, whether the first SFI is valid; and
means for refraining, in response to determining that the first SFI is valid, from transmitting the UL transmission.
69. The UE of clause 68, further comprising:
means for receiving, from the BS, a semi-persistent scheduling (SPS) configuration indicating a plurality of downlink (DL) SPS occasions,
wherein the means for refraining from transmitting the UL transmission comprises:
means for refraining from transmitting an acknowledgement/negative-acknowledgement (ACK/NACK) for a first DL SPS occasion of the plurality of DL SPS occasions.
70. The UE of clause 68, further comprising:
means for determining that the first SFI indicates a downlink direction for at least a first symbol,
wherein the means for refraining from transmitting the UL transmission comprises:
means for refraining from transmitting the UL transmission in one or more symbols including the first symbol in response to determining that the first SFI indicates the downlink direction for at least the first symbol.
71. The UE of clause 68, wherein the first SFI is associated with a group of UEs, and wherein the validation field includes a first validation portion associated with a subgroup of the group of UEs.
72. The UE of clause 71, wherein the validation field comprises a bitmap, and wherein each bit of the bitmap is associated with a different subgroup of the group of UEs.
73. The UE of clause 71, wherein a first bit of the validation field is associated with a high-priority subgroup of UEs, and wherein a second bit of the validation field is associated with a low-priority subgroup of UEs.
74. The UE of clause 68, wherein the means for receiving the first downlink information comprises:
means for receiving, in a group common-physical downlink control channel (GC PDCCH), the first downlink information including the first SFI and the validation field.
75. The UE of clause 74, further comprising:
means for decoding the first downlink information based on a radio network temporary identifier (RNTI) associated with the SFI validation.
76. The UE of clause 68,
wherein the means for receiving the first downlink information includes:
means for receiving, at a first time, the first downlink information including the first SFI, wherein the first SFI is associated with a first period, and wherein the UE further includes:
means for receiving, from the BS at a second time different from the first time, second downlink information including a second SFI and a second validation field for the second SFI, wherein the second SFI is associated with a second period at least partially overlapping with the first period; and
means for determining, based on the second validation field, whether the second SFI is valid.
77. The UE of clause 76, wherein the means for refraining from transmitting the UL transmission comprises:
means for refraining, in response to determining that the second SFI is valid, from transmitting the UL transmission during an overlapping period between the first period and the second period.
78. The UE of clause 76, further comprising:
means for selecting, in response to determining that the first SFI and the second SFI are valid, the first SFI.
79. The UE of clause 78, further comprising:
means for receiving a conflict resolution configuration,
wherein the means for selecting the first SFI comprises:
means for selecting the first SFI based on the conflict resolution configuration.
80. The UE of clause 67, further comprising:
means for determining, based on the monitoring, that the SFI validation has not occurred,
wherein the means for determining whether to transmit the UL transmission comprises:
means for determining to transmit the UL transmission based on a default slot configuration in response to determining that the SFI validation has not occurred.
81. The UE of clause 67, further comprising:
means for determining, based on the monitoring, that the SFI validation has not occurred; and
means for refraining, based on determining that the SFI validation has not occurred, from transmitting the UL transmission.
82. A base station (BS), comprising:
means for transmitting first downlink information including a first slot format indicator (SFI) and a validation field indicating the first SFI is invalid for a first group of user equipments (UEs) and valid for a second group of UEs; and
means for receiving, from at least a first UE of the first group of UEs, an UL transmission based on the first SFI being invalid for the first group of UEs.
83. The BS of clause 82, further comprising:
means for transmitting, to the first UE, a semi-persistent scheduling (SPS) configuration indicating a plurality of downlink (DL) SPS occasions,
wherein the means for receiving the UL transmission comprises:
means for receiving, from the first UE, an acknowledgement/negative-acknowledgement (ACK/NACK) for a DL communication signal in a first DL SPS occasion of the plurality of DL SPS occasions.
84. The BS of clause 82, wherein the first SFI is associated with a time period, wherein the BS further comprises:
means for refraining from monitoring for an UL transmission from the second group of UEs during the time period based on the first SFI being valid for the second group of UEs.
85. The BS of clause 84, further comprising:
means for transmitting, to a second UE of the second group of UEs, a second SPS configuration indicating a second plurality of DL SPS occasions;

means for cancelling a DL transmission in a first DL SPS occasion of the second plurality of DL SPS occasions; and means for determining, based at least in part on cancelling the DL transmission in the first DL SPS occasion of the second plurality of DL SPS occasions:

the first SFI; and that the first SFI is valid for the second group of UEs.

86. The BS of clause 82, wherein the first group of UEs includes a high-priority group of UEs, and wherein the second group of UEs includes a low-priority group of UEs.

87. The BS of clause 82, wherein the means for transmitting the first downlink information comprises:

means for transmitting, in a group common-physical downlink control channel (GC PDCCH), the first downlink information including the first SFI and the validation field.

88. The BS of clause 87, further comprising:

means for generating the first downlink information based on a radio network temporary identifier (RNTI) associated with a SFI validation.

89. The BS of clause 82, wherein the means for transmitting the first downlink information comprises:

means for transmitting, at a first time, the first downlink information including the first SFI, wherein the first SFI is associated with a first period, and wherein the BS further includes:

means for transmitting, at a second time different from the first time, second downlink information including a second SFI and a second validation field for the second SFI, wherein the second SFI is associated with a second period at least partially overlapping with the first period.

90. The BS of clause 89, further comprising:

means for transmitting, to at least one of the first group of UEs or the second group of UEs, a conflict resolution configuration indicating an instruction to select the first SFI if both the first SFI and the second SFI are validated.

91. The BS of clause 82, further comprising:

means for transmitting a first slot configuration indicating either an UL direction or a flexible symbol for at least a first symbol;

wherein the first SFI is associated with a second slot configuration, wherein the first SFI indicates a DL direction for at least the first symbol, and wherein the means for receiving the UL transmission comprises:

means for receiving, from at least the first UE of the first group in one more symbols including at least the first symbol, the UL transmission.

92. The BS of clause 91, wherein the means for transmitting the first slot configuration comprises:

means for transmitting, to the UE, a second SFI.

93. The BS of clause 91, wherein the means for transmitting the first slot configuration comprises:

means for transmitting, to the UE, a radio resource control (RRC) configuration, wherein the RRC configuration comprises the first slot configuration, and wherein the first slot configuration indicates a flexible symbol for the at least the first symbol.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of or" one or more of) indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:

determining that an uplink (UL) transmission is configured for a first time period;

monitoring for a slot format indicator (SFI) validation associated with the first time period; and determining, based at least in part on the monitoring, whether to transmit the UL transmission during the first time period;

wherein:

the monitoring for the SFI comprises:

receiving, from a base station (BS), first downlink information including a first SFI and a validation field associated with the first SFI; and the determining whether to transmit the UL transmission comprises:

determining, based on the validation field, whether the first SFI is valid; and
refraining, in response to determining that the first SFI is valid, from transmitting the UL transmission;
wherein the first SFI is associated with a group of UEs, and wherein the validation field includes a first validation portion associated with a subgroup of the group of UEs.

2. The method of claim 1, further comprising:
receiving, from the BS, a semi-persistent scheduling (SPS) configuration indicating a plurality of downlink (DL) SPS occasions,
wherein the refraining from transmitting the UL transmission comprises:
refraining from transmitting an acknowledgement/negative-acknowledgement (ACK/NACK) for a first DL SPS occasion of the plurality of DL SPS occasions.

3. The method of claim 1, further comprising:
determining that the first SFI indicates a downlink direction for at least a first symbol,
wherein the refraining from transmitting the UL transmission comprises:
refraining from transmitting the UL transmission in one or more symbols including the first symbol in response to determining that the first SFI indicates the downlink direction for at least the first symbol.

4. The method of claim 1, wherein the validation field comprises a bitmap, and wherein each bit of the bitmap is associated with a different subgroup of the group of UEs.

5. The method of claim 1, wherein a first bit of the validation field is associated with a high-priority subgroup of UEs, and wherein a second bit of the validation field is associated with a low-priority subgroup of UEs.

6. The method of claim 1, wherein the receiving the first downlink information comprises:
receiving, in a group common-physical downlink control channel (GC-PDCCH), the first downlink information including the first SFI and the validation field.

7. The method of claim 6, further comprising:
decoding the first downlink information based on a radio network temporary identifier (RNTI) associated with the SFI validation.

8. A method of wireless communication performed by a user equipment (UE), the method comprising:
determining that an uplink (UL) transmission is configured for a first time period;
monitoring for a slot format indicator (SFI) validation associated with the first time period; and
determining, based at least in part on the monitoring, whether to transmit the UL transmission during the first time period;
wherein:
the monitoring for the SFI comprises:
receiving, from a base station (BS), first downlink information including a first SFI and a validation field associated with the first SFI; and
the determining whether to transmit the UL transmission comprises:
determining, based on the validation field, whether the first SFI is valid; and
refraining, in response to determining that the first SFI is valid, from transmitting the UL transmission;
wherein the receiving the first downlink information includes receiving, at a first time, the first downlink information including the first SFI, wherein the first SFI is associated with a first period, and
wherein the method further includes:
receiving, from the BS at a second time different from the first time, second downlink information including a second SFI and a second validation field for the second SFI, wherein the second SFI is associated with a second period at least partially overlapping with the first period; and
determining, based on the second validation field, whether the second SFI is valid.

9. The method of claim 8, wherein the refraining from transmitting the UL transmission comprises:
refraining, in response to determining that the second SFI is valid, from transmitting the UL transmission during an overlapping period between the first period and the second period.

10. The method of claim 8, further comprising:
selecting, in response to determining that the first SFI and the second SFI are valid, the first SFI.

11. The method of claim 10, further comprising:
receiving a conflict resolution configuration,
wherein the selecting the first SFI comprises selecting the first SFI based on the conflict resolution configuration.

12. A user equipment (UE), comprising:
a processor configured to:
determine that an uplink (UL) transmission is configured for a first time period;
monitor for a slot format indicator (SFI) validation associated with the first time period; and
determine, based at least in part on the monitoring, whether to transmit the UL transmission during the first time period;
a transceiver, wherein:
the processor configured to monitor for the SFI comprises:
the processor configured to cause the transceiver to:
receive, from a base station (BS), first downlink information including a first SFI and a validation field associated with the first SFI, and
wherein the processor configured to determine whether to transmit the UL transmission comprises the processor configured to:
determine, based on the validation field, whether the first SFI is valid; and
refrain, in response to determining that the first SFI is valid, from transmitting the UL transmission;
wherein the first SFI is associated with a group of UEs, and wherein the validation field includes a first validation portion associated with a subgroup of the group of UEs.

13. The UE of claim 5, wherein the transceiver is configured to:
receive, from the BS, a semi-persistent scheduling (SPS) configuration indicating a plurality of downlink (DL) SPS occasions, and
wherein the processor configured to refrain from transmitting the UL transmission comprises the processor configured to:
refrain from transmitting an acknowledgement/negative-acknowledgement (ACK/NACK) for a first DL SPS occasion of the plurality of DL SPS occasions.

14. The UE of claim 5, wherein the processor is further configured to:
determine that the first SFI indicates a downlink direction for at least a first symbol, wherein the processor configured to refrain from transmitting the UL transmission comprises the processor configured to:
refrain from transmitting the UL transmission in one or more symbols including the first symbol in response to determining that the first SFI indicates the downlink direction for at least the first symbol.

15. The UE of claim 12, wherein the validation field comprises a bitmap, and wherein each bit of the bitmap is associated with a different subgroup of the group of UEs.

16. The UE of claim 12, wherein a first bit of the validation field is associated with a high-priority subgroup of UEs, and wherein a second bit of the validation field is associated with a low-priority subgroup of UEs.

17. The UE of claim 12, wherein the processor configured to cause the transceiver to receive the first downlink information comprises the transceiver configured to:
receive, in a group common-physical downlink control channel (GC-PDCCH), the first downlink information including the first SFI and the validation field.

18. The UE of claim 17, wherein the processor is further configured to:
decode the first downlink information based on a radio network temporary identifier (RNTI) associated with the SFI validation.

19. A user equipment (UE), comprising:
a processor configured to:
determine that an uplink (UL) transmission is configured for a first time period;
monitor for a slot format indicator (SFI) validation associated with the first time period; and
determine, based at least in part on the monitoring, whether to transmit the UL transmission during the first time period;
a transceiver, wherein:
the processor configured to monitor for the SFI comprises:
the processor configured to cause the transceiver to:
receive, from a base station (BS), first downlink information including a first SFI and a validation field associated with the first SFI, and
wherein the processor configured to determine whether to transmit the UL transmission comprises the processor configured to:
determine, based on the validation field, whether the first SFI is valid; and
refrain, in response to determining that the first SFI is valid, from transmitting the UL transmission;
wherein the processor configured to cause the transceiver to receive the first downlink information comprises:
the transceiver configured to:
receive, at a first time, the first downlink information including the first SFI, wherein the first SFI is associated with a first period, and
wherein the transceiver is further configured to:
receive, from the BS at a second time different from the first time, second downlink information including a second SFI and a second validation field for the second SFI, wherein the second SFI is associated with a second period at least partially overlapping with the first period, and
wherein the processor is further configured to:
determine, based on the second validation field, whether the second SFI is valid.

20. The UE of claim 19, wherein the processor configured to refrain from transmitting the UL transmission comprises the processor configured to:
refrain, in response to determining that the second SFI is valid, from transmitting the UL transmission during an overlapping period between the first period and the second period.

21. The UE of claim 19, wherein the processor is further configured to:
select, in response to determining that the first SFI and the second SFI are valid, the first SFI.

22. The UE of claim 21, wherein the transceiver is further configured to:
receive a conflict resolution configuration,
wherein the processor configured to select the first SFI comprises the processor configured to:
select the first SFI based on the conflict resolution configuration.

* * * * *